US011902288B2

(12) United States Patent
Lebeau et al.

(10) Patent No.: US 11,902,288 B2
(45) Date of Patent: *Feb. 13, 2024

(54) ARTIFICIAL REALITY COLLABORATIVE WORKING ENVIRONMENTS

(71) Applicant: Meta Platforms Technologies, LLC, Menlo Park, CA (US)

(72) Inventors: Michael James Lebeau, Amsterdam (NL); Manuel Ricardo Freire Santos, London (GB); Aleksejs Anpilogovs, London (GB); Alexander Sorkine Hornung, Zurich (CH); Björn Wanbo, London (GB); Connor Treacy, London (GB); Fangwei Lee, San Carlos, CA (US); Federico Ruiz, London (GB); Jonathan Mallinson, Wrecsam (GB); Jonathan Richard Mayoh, Menlo Park, CA (US); Marcus Tanner, Old Windsor (GB); Panya Inversin, Los Angeles, CA (US); Sarthak Ray, San Antonio, TX (US); Sheng Shen, Shoreline, WA (US); William Arthur Hugh Steptoe, London (GB); Alessia Marra, Zurich (CH); Gioacchino Noris, Zurich (CH); Derrick Readinger, Philadelphia, PA (US); Jeffrey Wai-King Lock, Erlenbach (CH); Jeffrey Witthuhn, Oakland, CA (US); Jennifer Lynn Spurlock, Seattle, WA (US); Larissa Heike Laich, Zurich (CH); Javier Alejandro Sierra Santos, London (GB)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,512

(22) Filed: Feb. 9, 2023

(65) Prior Publication Data
US 2023/0188533 A1    Jun. 15, 2023

Related U.S. Application Data

(63) Continuation of application No. 17/085,579, filed on Oct. 30, 2020, now Pat. No. 11,606,364.

(Continued)

(51) Int. Cl.
*G06T 19/00*    (2011.01)
*H04L 9/40*    (2022.01)
(Continued)

(52) U.S. Cl.
CPC ........... *H04L 63/107* (2013.01); *G06F 3/011* (2013.01); *G06F 3/0219* (2013.01);
(Continued)

(58) Field of Classification Search
CPC ... H04L 63/107; H04L 65/70; H04L 65/4015; H04L 65/4046; G06V 40/107;
(Continued)

(56) References Cited

U.S. PATENT DOCUMENTS 8,266,536 B2    9/2012    Roberts et al.
8,615,383 B2    12/2013   Dobbins et al.
(Continued)

FOREIGN PATENT DOCUMENTS

NO        343601 B1      4/2019
WO    2019059944 A1      3/2019

OTHER PUBLICATIONS

International Search Report and Written Opinion for International Application No. PCT/US2021/050427, dated Feb. 25, 2022, 19 pages.
(Continued)

*Primary Examiner* — Haoshian Shih
(74) *Attorney, Agent, or Firm* — Potomac Law Group, PLLC; Dannon G. Allbee

(57) ABSTRACT

Aspects of the present disclosure are directed to creating and administering artificial reality collaborative working environments and providing interaction modes for them. An XR work system can provide and control such artificial reality collaborative working environments to enable, for example, A) links between real-world surfaces and XR surfaces; B) links between multiple real-world areas to XR areas with dedicated functionality; C) maintaining access, while inside the artificial reality working environment, to real-world work tools such as the user's computer screen and keyboard; D) various hand and controller modes for different interaction and collaboration modalities; E) use-based, multi-desk collaborative room configurations; and F) context-based auto population of users and content items into the artificial reality working environment.

19 Claims, 33 Drawing Sheets

Related U.S. Application Data

(60) Provisional application No. 63/078,821, filed on Sep. 15, 2020.

(51) Int. Cl.
| | |
|---|---|
| *G06F 3/02* | (2006.01) |
| *G06F 3/01* | (2006.01) |
| *G06F 3/14* | (2006.01) |
| *G06V 40/10* | (2022.01) |
| *H04L 65/401* | (2022.01) |
| *H04L 65/403* | (2022.01) |
| *H04L 65/70* | (2022.01) |

(52) U.S. Cl.
CPC .......... *G06F 3/1423* (2013.01); *G06T 19/003* (2013.01); *G06T 19/006* (2013.01); *G06V 40/107* (2022.01); *H04L 65/4015* (2013.01); *H04L 65/4046* (2013.01); *H04L 65/70* (2022.05); *G06T 2219/024* (2013.01)

(58) Field of Classification Search
CPC ...... G06F 3/011; G06F 3/0219; G06F 3/1423; G06T 19/003; G06T 19/006; G06T 2219/024
See application file for complete search history.

(56) References Cited

U.S. PATENT DOCUMENTS

| | | | |
|---|---|---|---|
| 8,806,354 B1 * | 8/2014 | Hyndman | H04L 65/403 709/204 |
| 8,949,159 B2 | 2/2015 | Krishnakumar et al. | |
| 9,038,127 B2 | 5/2015 | Hastings et al. | |
| 9,836,595 B1 | 12/2017 | Goldberg et al. | |
| 10,347,040 B2 | 7/2019 | Boulkenafed et al. | |
| 11,302,085 B2 | 4/2022 | LeBeau et al. | |
| 2003/0005177 A1 | 1/2003 | Duran et al. | |
| 2009/0113066 A1 | 4/2009 | Van Wie et al. | |
| 2009/0119604 A1 | 5/2009 | Simard et al. | |
| 2010/0214226 A1 | 8/2010 | Brown et al. | |
| 2012/0192088 A1 | 7/2012 | Sauriol et al. | |
| 2012/0302076 A1 | 11/2012 | Tsai | |
| 2013/0335405 A1 | 12/2013 | Scavezze et al. | |
| 2014/0123170 A1 | 5/2014 | Kummer | |
| 2016/0313790 A1 | 10/2016 | Clement et al. | |
| 2016/0314624 A1 | 10/2016 | Li et al. | |
| 2017/0262045 A1 | 9/2017 | Rouvinez et al. | |
| 2017/0269713 A1 | 9/2017 | Marks et al. | |
| 2018/0004305 A1 | 1/2018 | Moseley et al. | |
| 2018/0095542 A1 | 4/2018 | Mallinson | |
| 2018/0284982 A1 | 10/2018 | Veeramani et al. | |
| 2018/0307303 A1 | 10/2018 | Powderly et al. | |
| 2018/0350150 A1 | 12/2018 | Powderly et al. | |
| 2019/0327392 A1 | 10/2019 | Sarkar | |
| 2019/0394444 A1 | 12/2019 | Oh et al. | |
| 2020/0151065 A1 | 5/2020 | Rinaldi et al. | |
| 2020/0175766 A1 | 6/2020 | Gawrys et al. | |
| 2021/0065455 A1 | 3/2021 | Beith et al. | |
| 2021/0144220 A1 | 5/2021 | Zavesky et al. | |
| 2021/0336784 A1 | 10/2021 | Athlur et al. | |
| 2022/0053218 A1 | 2/2022 | Malecki | |
| 2022/0066620 A1 | 3/2022 | Anderson et al. | |
| 2022/0084288 A1 | 3/2022 | LeBeau et al. | |
| 2022/0124125 A1 | 4/2022 | Punwani et al. | |
| 2022/0172444 A1 | 6/2022 | Lebeau et al. | |

OTHER PUBLICATIONS

Invitation to Pay Additional Fees for International Application No. PCT/US2021/050427, dated Jan. 4, 2022, 14 pages.
International Preliminary Report on Patentability for International Application No. PCT/US2021/050427, dated Mar. 30, 2023, 15 pages.

* cited by examiner

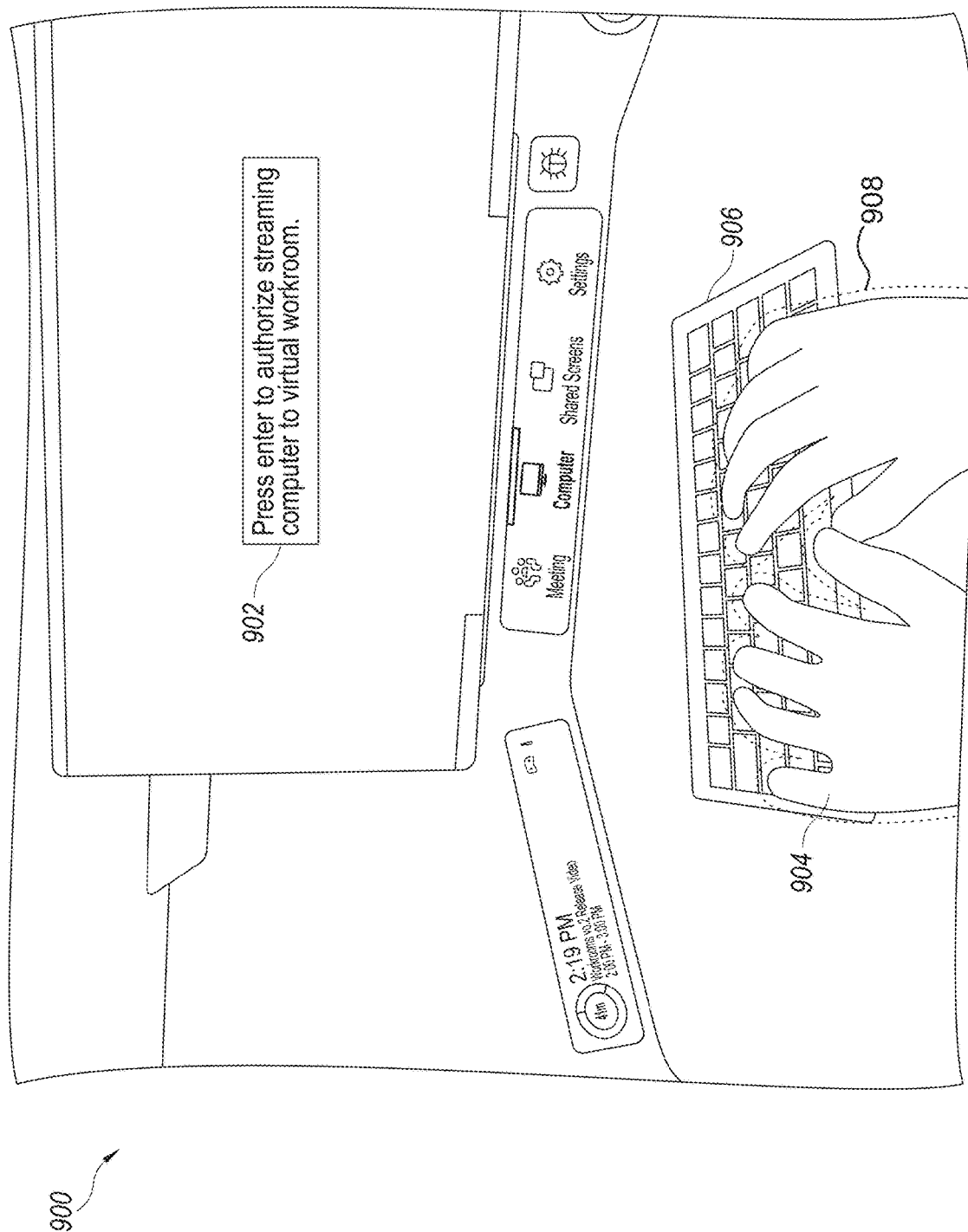

ARTIFICIAL REALITY COLLABORATIVE WORKING ENVIRONMENTS

CROSS-REFERENCE TO RELATED APPLICATIONS

This application is a continuation of U.S. application Ser. No. 17/085,579, titled "Artificial Reality Collaborative Working Environments," filed Oct. 30, 2020 which claims priority to U.S. Provisional Patent Application No. 63/078,821, titled "Artificial Reality Collaborative Working Environments," filed Sep. 15, 2020, and is related to U.S. application Ser. No. 17/085,623, titled "Artificial Reality Collaborative Working Environments," U.S. application Ser. No. 17/085,652, titled "Artificial Reality Collaborative Working Environments," and to U.S. application Ser. No. 17/085,852, titled "Artificial Reality Collaborative Working Environments," all of which are herein incorporated by reference in their entirety.

TECHNICAL FIELD

The present disclosure is directed to creating and administering artificial reality collaborative working environments and providing interaction modes for them.

BACKGROUND

As the global marketplace increases, and challenges such as distributed teams and health concerns requiring social distancing become more prevalent, remote working and collaboration is becoming ever more common. Remote working typically involves an assortment of technologies such as remote access to shared documents, various texts-based communication services (e.g., email, instant message, text message, etc.), telephone communication, and video calling. Such remote working provides a number of benefits, such as reduced travel times, increased health and safety, and greater flexibility. However, remote workers face a number of challenges not experienced by their in-office counterparts. For example, video calls remain a pale imitation of face-to-face interactions. Understanding body language and context can be difficult with only a two-dimensional ("2D") representation of a sender. In addition, the limitation of video calling on a flat panel display introduces an intrusive layer of technology that can distract from communication and diminishes the perception of in-person communication. Remote workers often complain of missing out on the "watercooler" conversations, and often feel forgotten by their coworkers. Further, collaboration between teams in remote locations using traditional voice or 2D communication channels have been less effective than in-person experiences, e.g., with documents and whiteboard spaces that various participants can view and work on simultaneously.

Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Various XR environments exist, allowing representations of users to move about and speak with one another. However, such XR environments hove not effectively been created to facilitate collaboration and do not integrate into workflows for remote workers.

BRIEF DESCRIPTION OF THE DRAWINGS

FIGS. 9A and 9B are conceptual diagrams illustrating an example of obtaining authorization, while in VR, for streaming a computer screen into the artificial reality working environment.

The techniques introduced here may be better understood by referring to the following Detailed Description in conjunction with the accompanying drawings, in which like reference numerals indicate identical or functionally similar elements.

DETAILED DESCRIPTION

Figure 1:
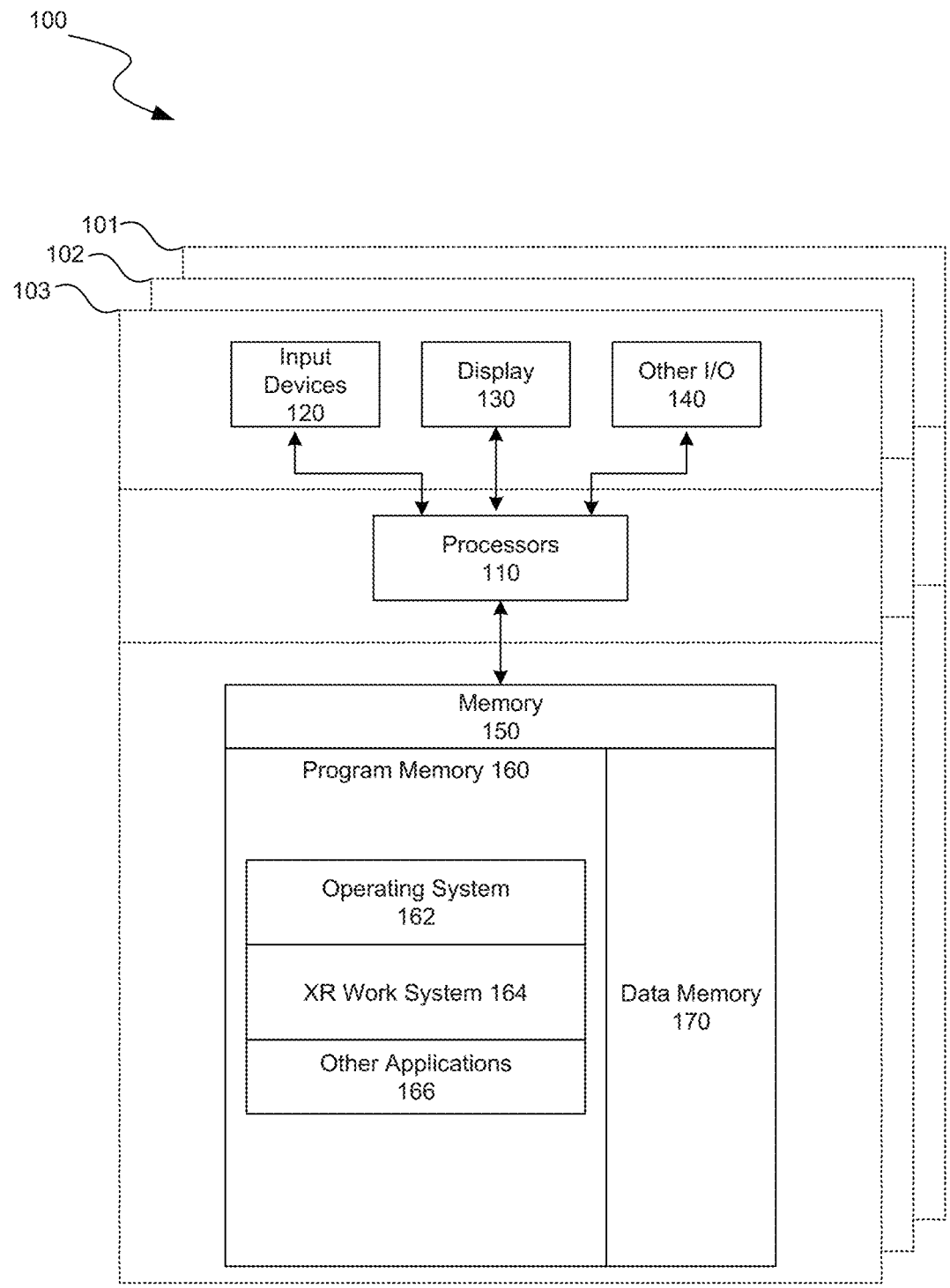
FIG. 1 is a block diagram illustrating an overview of devices on which some implementations of the present technology can operate.

Aspects of the present disclosure are directed to creating and administering artificial reality collaborative working environments and providing interaction modes for them. An XR work system can provide and control such artificial reality collaborative working environments (also referred to herein as "artificial reality working environments") to enable, for example, A) links between real-world surfaces and XR surfaces; B) links between multiple real-world areas and corresponding XR areas with dedicated functionality; C) maintaining access, while inside the artificial reality working environment, to real-world work tools such as the user's computer screen and keyboard; D) various hand and controller modes for different interaction and collaboration modalities; E) use-based, multi-desk collaborative room configurations; and F) context-based auto population of users and content items into the artificial reality working environment. As used herein, something that is "real-world" is non-computer generated. For example, a real-world space is a physical space occupying a location outside a computer and a real-world object is a physical object having physical properties outside a computer.

The XR work system can enable XR surfaces with links to real-world surfaces or planes, such as a XR desk area linked to a real-world desk area and a real-world standing area linked to an XR whiteboarding area. The XR work system can accomplish linking a real-world desk to an XR desk by identifying contours of the real-world desk (e.g., height and edges), determining a dedicated space on the real-world desk, identifying real-world objects in the dedicated space (such as a tracked keyboard or miscellaneous objects that may interfere with movement in the artificial reality working environment), and setting anchors in the artificial reality working environment in relation to the dedicated space. The XR work system can also accomplish linking of a real-world area to a whiteboard space by establishing a real-world area separate from the real-world desk to which the user can move to enable alternate functionality such as collaborative whiteboarding. Additional details on linking real-world surfaces or planes to XR surfaces and linking multiple real-world areas to XR areas with dedicated functionality are described below in relation to FIGS. 5-7 and 16.

The XR work system can, while a user is inside the artificial reality working environment, maintain the user's access to real-world work tools such as the user's computer screen, mouse, keyboard, or to other tracked objects such as a coffee mug. The XR work system can provide access to the user's computer screen while the user is in VR by streaming a version of the computer screen to be presented in the artificial reality working environment. In some cases, this can be accomplished using an application installed on the user's computer that can connect to the XR device to provide a version of the computer screen (e.g., as frames of video, content to re-create and display in the artificial reality working environment, etc.) In some implementations, a user will need to provide authorization to allow their computer screen to be streamed into the artificial reality working environment. The XR work system can avoid requiring the user to exit the artificial reality working environment to provide this authorization by presenting an authorization request, via the application, in the foreground of the computer such that keyboard strokes are routed to the authorization request. The XR work system can also provide a notification in the artificial reality working environment, instructing the user to press an authorization key (e.g., "enter"), allowing the user to respond to the authorization request without removing their XR device.

The XR work system can provide the user access to her physical keyboard, while in the artificial reality working environment, to enable this authorization and/or provide other keyboard input to her computer. The XR work system can accomplish this by tracking a position of the user's keyboard and presenting a model of the keyboard in the artificial reality working environment while also tracking a position of the user's hands. A keyboard where the real-world position of the keyboard is tracked and a corresponding model of the keyboard is presented, at a location according to the tracked real-world position, in an artificial reality environment is referred to herein as an "MR Keyboard." When the position of one of the user's hands is within a threshold distance of the keyboard, the XR work system can display video of the user's real-world hands in the artificial reality working environment, allowing the user precise control of their hands in relation to the keyboard. Such a real-world keyboard with a corresponding model in the artificial reality working environment is referred to herein as a mixed reality or "MR" keyboard. Taking video from external cameras of a virtual reality system and displaying it in the artificial reality working environment, either showing the complete real-world or a portion of the real-world (e.g., just the user's hands, just a desktop area, or just a tracked object) while the user maintains vision through the virtual reality system is referred to herein as "passthrough." Additional details on providing access to real-world tools while inside the artificial reality working environment are described below in relation to FIGS. 8-10.

The XR work system can provide various hand and controller modes for different interaction and collaboration modalities. In various and limitations, these can include a hand gesture mode to enable when the user is gesturing or otherwise not interacting with objects; a keyboard passthrough mode, discussed above, for selective hand passthrough to enable interacting with an MR keyboard; a hand ghost mode for interacting with objects in the artificial reality working environment; a normal controller mode to enable for standard controller interactions (e.g., pointing, selecting, ray casting, etc.); and a scribe controller mode to enable use of the controller as a scribe tool in the artificial reality working environment. In some implementations, enabling the keyboard passthrough mode occurs when one or both of the user's hands are within a threshold distance of the MR keyboard. In some cases, enabling the hand ghost mode occurs when one or both of the user's hands are within a threshold distance of an object in the artificial reality working environment that can be selected and/or manipulated. In some implementations, the hand gesture mode is enabled when neither of the keyboard passthrough mode or hand ghost mode is enabled and the user is not holding a controller. The normal controller mode can be enabled when the user is holding the controller normally (e.g., with her hand wrapped around the controller with fingers over buttons). The scribe controller mode can be enabled when the user is holding a controller as a writing implement (e.g., when an end of the controller opposite primary controller buttons is being held between thumb and one or more fingers). Additional details on providing various hand and controller modes for different interaction and collaboration modalities are described below in relation to FIGS. 10-15.

Once a user is in an artificial reality working environment, with an established desk space and/or whiteboard space, the XR work system can further facilitate collaboration between this user and one or more other users. For example, the XR work system can provide different multi-desk room configurations, allowing participants to engage with each other between desks. In various implementations, these room configurations can include a presentation mode to arrange the desks around a presenter; a pod configuration allowing multiple desks to be arranged in a group; a conference table configuration where desks are joined into one large table; or a shared desk configuration where multiple users appear to themselves to be at their own desk, but the dedicated XR space on their desk is mirrored across all the shared desks such that a change by any users is reflected in the dedicated spaces of all the shared desk participants. In various implementations, users can manually select which room configuration in which to arrange desks or the XR work system can automatically select a room configuration based on context (e.g., what mode various users are in, volume of the user's voice, amount of whiteboard space a user is drawing into, content of a conversation and/or shared documents, etc.) Additional details on multi-desk collaborative room configurations are described below in relation to FIGS. 17 and 18.

The XR work system can also, based on a previous context, auto populate content into an artificial reality working environment and/or have certain users join an artificial reality working environment when they put on their XR device. For example, which artificial reality working environment a user is added to and/or content items automatically brought into the artificial reality working environment can be based on whether people were on a shared thread (e.g., chat, email, video call etc.) prior to donning their XR device, which content items have been shared in such a thread, content items a user was interacting with on his computer when he put on the XR device or in a threshold amount of time prior to putting on the XR device, etc. The XR work system can also facilitate easy "to VR" manual movement of content items into the artificial reality working environment, such as by providing a drag-and-drop system where files dragged onto a control are added to the artificial reality working environment; voice commands where the system can be given an identifier for an model, file, thread, image, etc., with a command to move it into an artificial reality working environment; through a control added into an application (e.g., a new menu item) to add to the current content item into an artificial reality working environment; allowing a user to pull items out of her streamed computer screen in VR, etc. Activating these manual "to VR" commands can be done prior to entering the artificial reality working environment or using the stream of the user's computer screen into the artificial reality working environment (discussed above). Additional details on context-based auto population and manual addition of content items into the artificial reality working environment are described below in relation to FIGS. 19 and 20.

Embodiments of the disclosed technology may include or be implemented in conjunction with an artificial reality system. Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real-world and then display the images on the screen on the opposite side of the tablet from the camera. The tablet can process and adjust or "augment" the images as they passthrough the system, such as by adding virtual objects. "Mixed reality" or "MR" refers to systems where light entering a user's eye is partially generated by a computing system and partially composes light reflected off objects in the real-world. For example, a MR headset could be shaped as a pair of glasses with a pass-through display, which allows light from the real-world to passthrough a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

While there are existing virtual environment systems, they fail to provide interactions for working that provide the benefits of in-office work, they are cumbersome to use, they often result in miscommunications, and they generally take considerable user effort and precision to accomplish any work. Further, remote working systems generally include a host of separate communication, file sharing, and productivity tools, which often do not work well together, are difficult to move content between, and often also result in lost content or miscommunications.

The XR work system and processes described herein are expected to overcome these problems associated with using existing tools for collaborative working, providing more realistic interactions, better content sharing, linking to real-world spaces and objects for both movement and physical sensations for virtual interactions, maintaining access to traditional work tools (such as the user's keyboard and computer screen) while in a virtual environment, providing various hand modes for different interaction modalities, providing different multi-desk room configurations for different work activities, and context-based automatic addition of people and content items to the artificial reality working environment. In addition, while the disclosed XR work system provides a result comparable, and in some cases an improvement over, in-person work experiences, the processes and systems to achieve these benefits are not analogs of existing communication techniques, but instead introduce completely new ways of relating real-world and virtual components, providing dedicated virtual spaces for work functions while keeping those virtual spaces able to accommodate different numbers of users and working goals, etc.

Several implementations are discussed below in more detail in reference to the figures. FIG. 1 is a block diagram illustrating an overview of devices on which some implementations of the disclosed technology can operate. The devices can comprise hardware components of a computing system 100 that can create, administer, and provide interaction modes for an artificial reality collaborative working environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, XR work system 164, and other application programs 166. Memory 150 can also include data memory 170 that can include information to be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
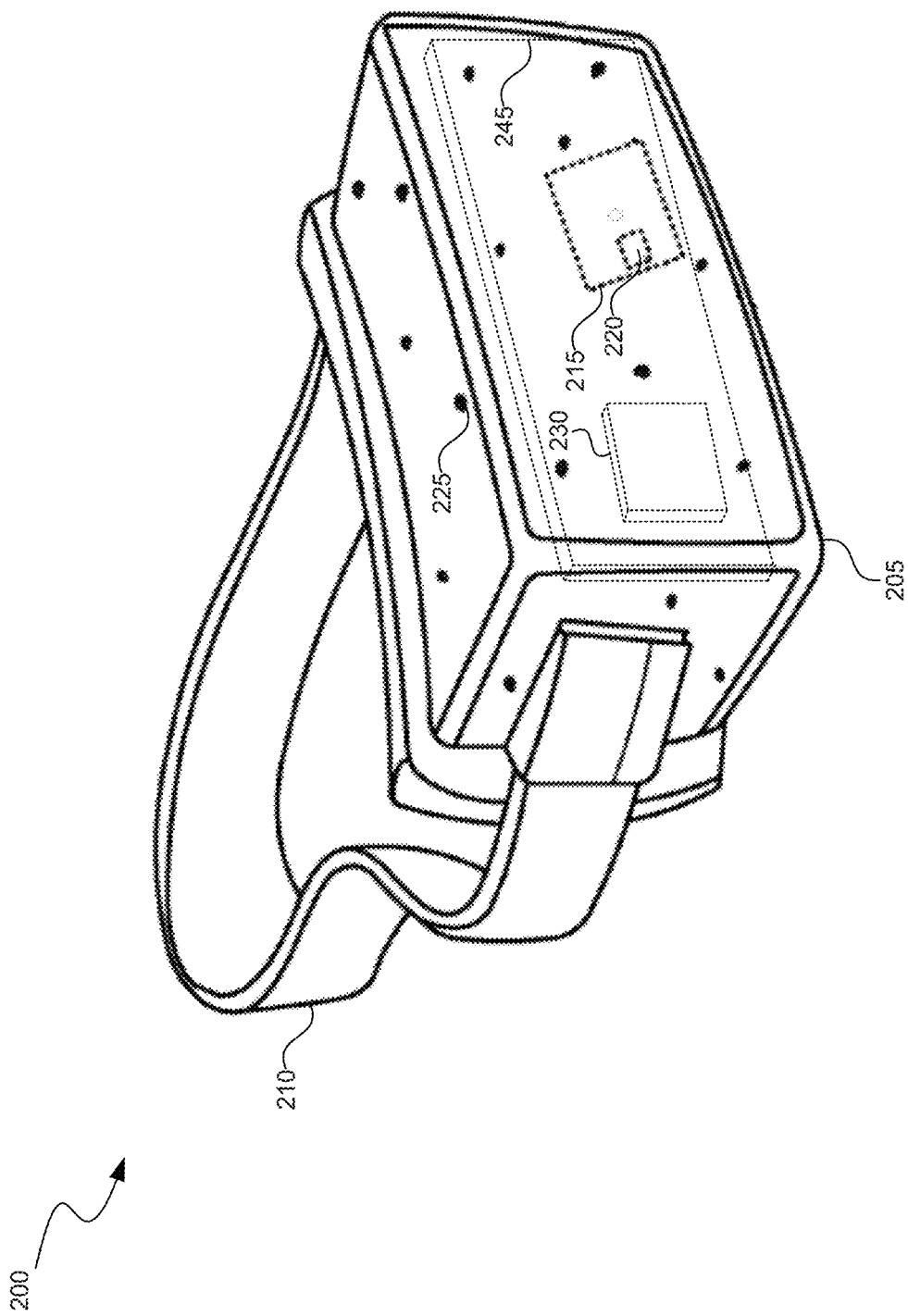
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real-world and in a virtual environment in three degrees of freedom (3 DoF) or six degrees of freedom (6 DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
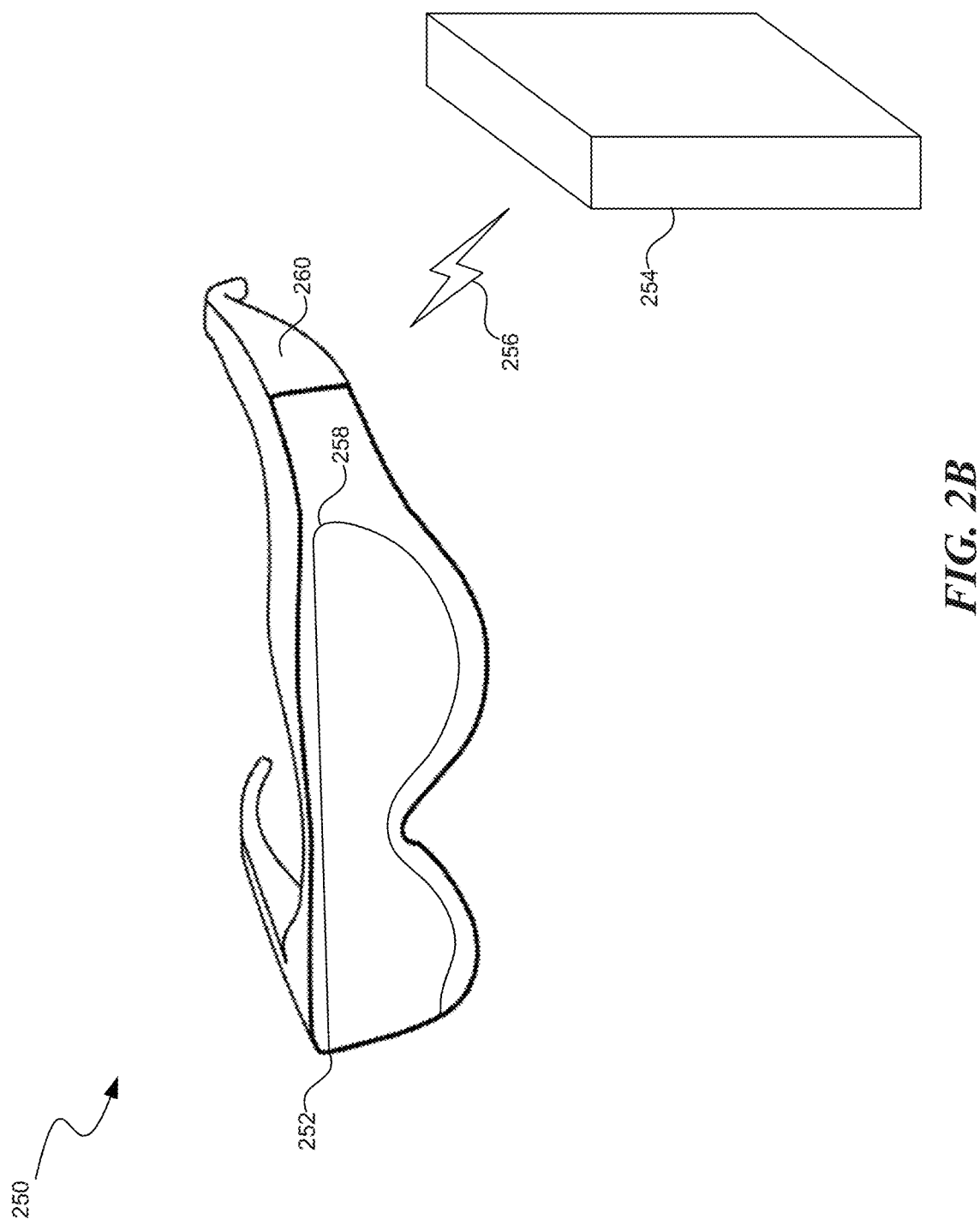
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real-world.

Similarly to the HMD 200, the HMD system 250 can also include motion and position tracking units, cameras, light sources, etc., which allow the HMD system 250 to, e.g., track itself in 3 DoF or 6 DoF, track portions of the user (e.g., hands, feet, head, or other body parts), map virtual objects to appear as stationary as the HMD 252 moves, and have virtual objects react to gestures and other real-world objects.

Figure 2C:
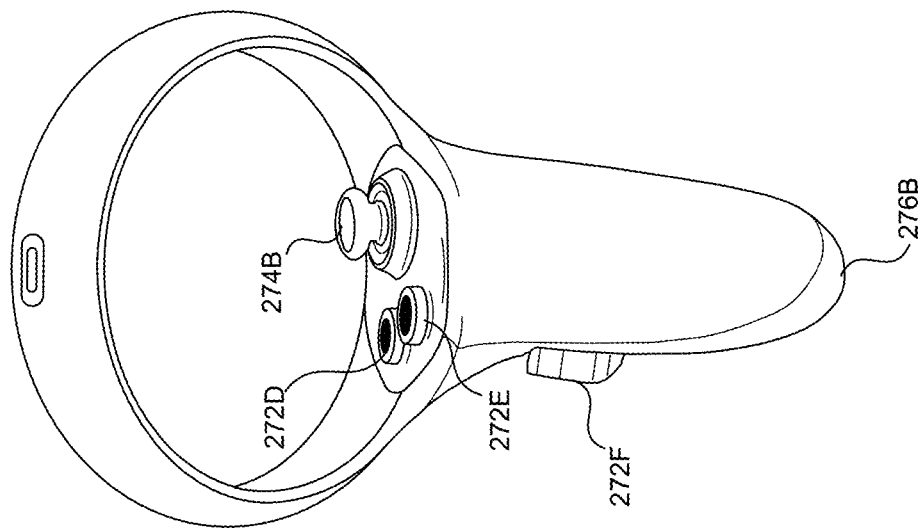
FIG. 2C is a wire diagram illustrating a mixed reality headset which can be used in some implementations of the present technology.
Figure 2C:
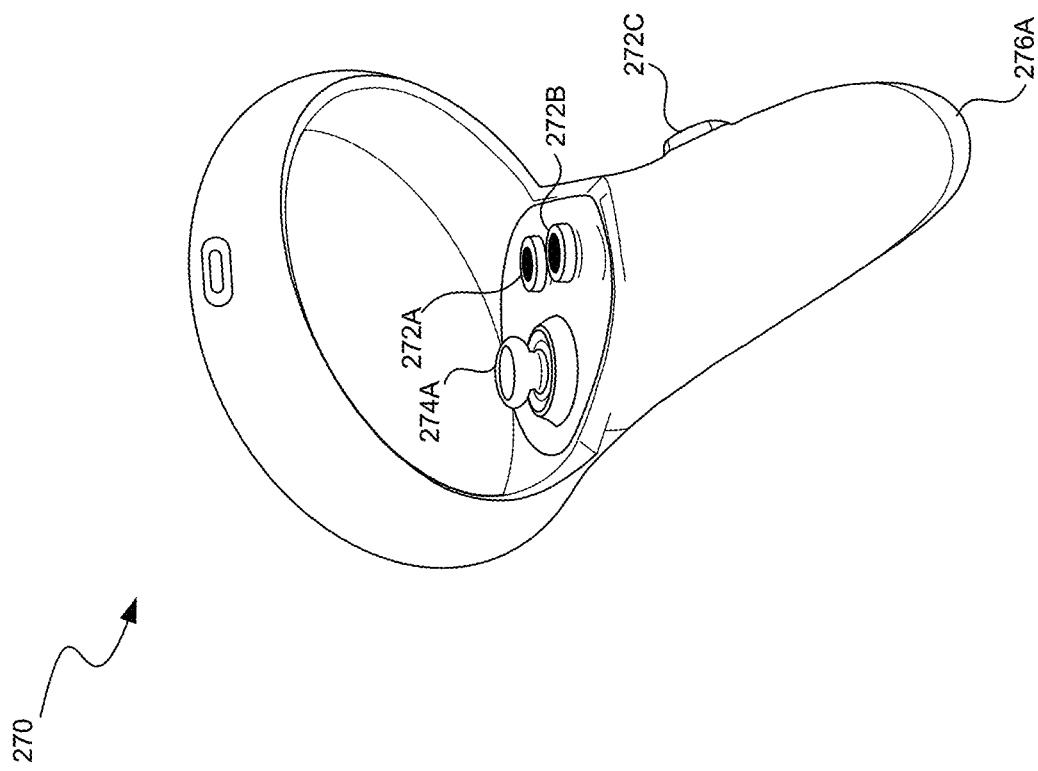

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3 DoF or 6 DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects. As discussed below, controllers 270 can also have tips 276A and 276B, which, when in scribe controller mode, can be used as the tip of a writing implement in the artificial reality working environment.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
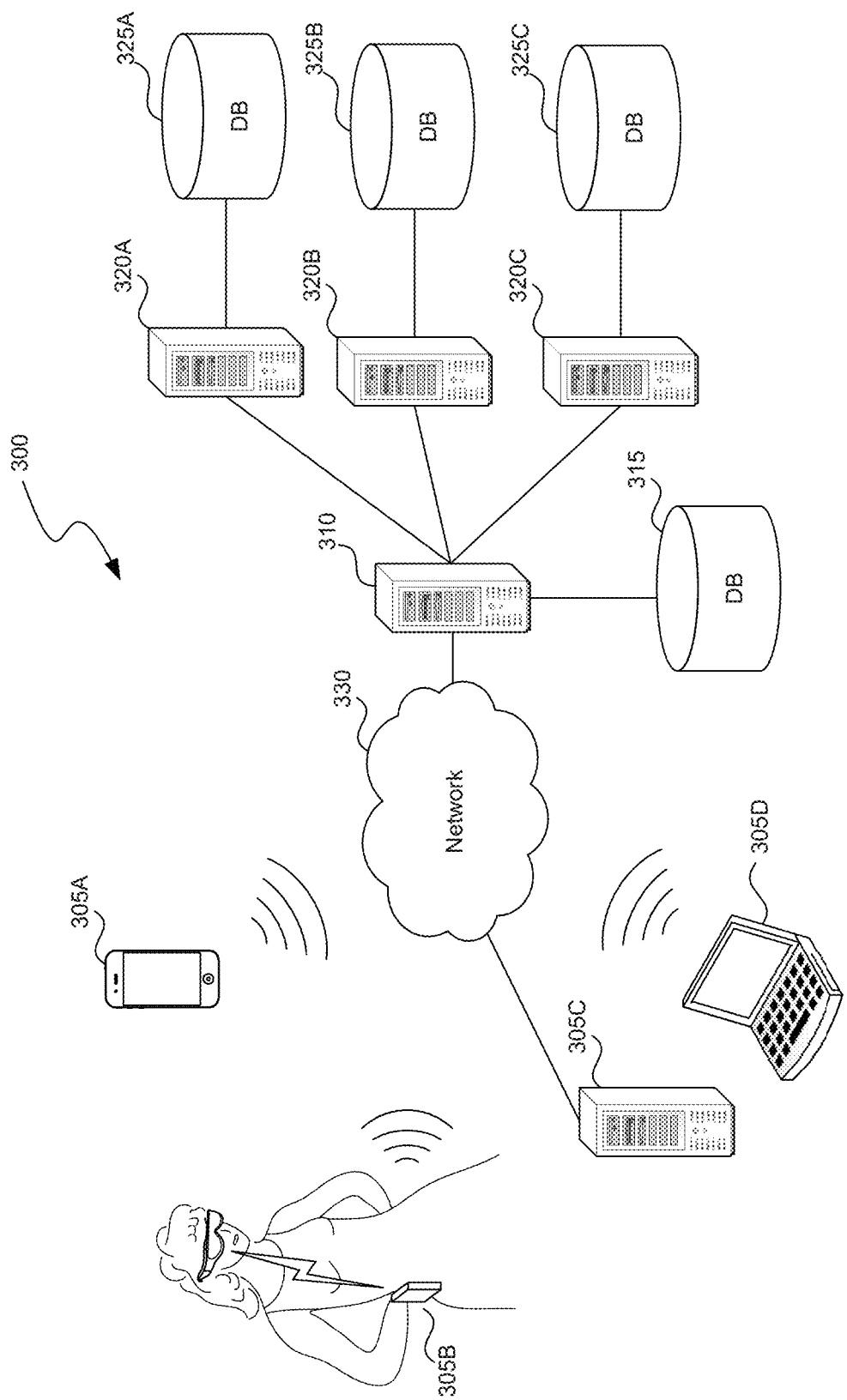
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, servers 310 and 320 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g., indicia provided from a client device such as emotion indicators, status text snippets, location indictors, etc.), or other multi-media, hi various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, hi various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, hi various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (via their avatar or true-to-life representation) with objects or other avatars in a virtual environment (e.g., in an artificial reality working environment), etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 4:
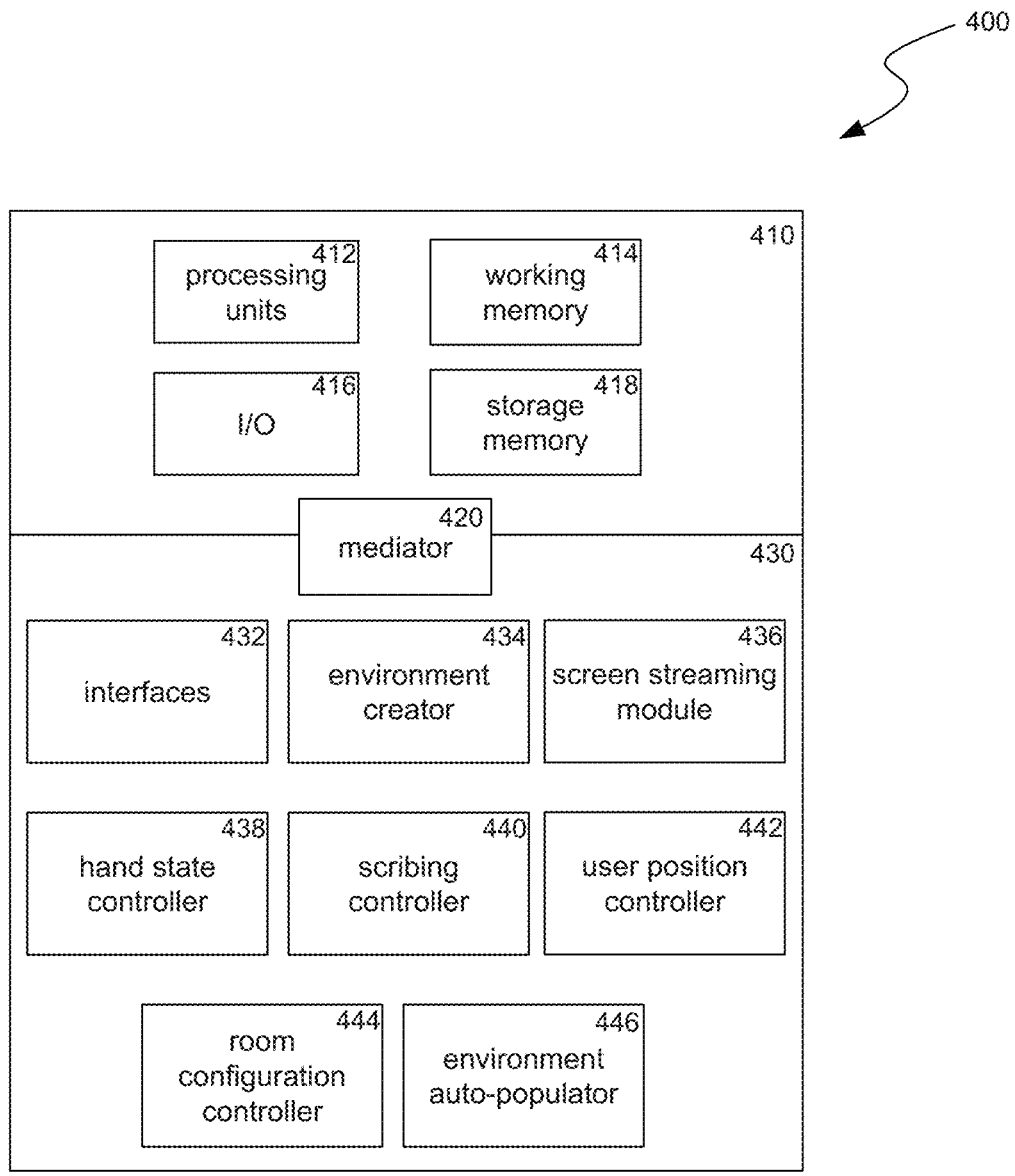
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for creating and administering artificial reality collaborative working environments and providing interaction modes for them. Specialized components 430 can include environment creator 434, screen streaming module 436, hand state controller 438, scribing controller 440, user position controller 442, room configuration controller 444, environment auto-populator 446, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Environment creator 434 can create an artificial reality working environment with both a desk area and a one or more whiteboard areas. The desk area can be linked to a space at a real-world desk and the whiteboard areas can be linked to real-world open spaces. The desk area can have a dedicated space and tracked objects such as an MR keyboard. Additional details on creating an artificial reality working environment with areas linked to real-world spaces are provided below in relation to FIGS. 5-7.

Screen streaming module 436 can obtain authorization for streaming a user's computer screen into an artificial reality working environment, can, in conjunction with an application executed on the user's computer, obtain the stream of the user's computer screen, and can display the stream in various configurations in the artificial reality working environment. Additional details on streaming a user's computer screen into an artificial reality working environment are provided below in relation to FIGS. 8 and 9.

Hand state controller 438 can transition representations of user's hands into various states (also referred to herein as modes), such as a keyboard passthrough hand state, a ghost interactive hand state, or a gesture hand state. The keyboard passthrough hand state can be enabled when the hand state controller 438 detects that the user's hands are within a threshold distance of an MR keyboard, and this mode can include determining the contours of the user's hands and enabling passthrough so the user can see the real-world version of just their hands as they are over the MR keyboard. The ghost interactive hand state can be enabled when the hand state controller 438 detects that the user's hands are within a threshold distance of an interactive object, and this mode can include showing the user's hands as only partially opaque and can include casting a ray from the user's hand. In the ghost interactive hand state, the user can select and manipulate interactive objects either with their hand/or with the projected ray. In some implementations, as a user's hand approaches an interactive object, the user's hand can fade from a gesture state to the ghost interactive hand state. The gesture state can be enabled when neither the keyboard passthrough state nor the ghost interactive state are enabled, and this mode can include showing the user's hands as fully opaque (e.g., with a particular skin tone). Additional details on transitioning between the hand states and the effect of being in each hand state are provided below in relation to FIGS. 10-13.

Scribing controller 440 can detect whether a user is holding a controller normally or as a scribe tool. When scribing controller 440 detects that the user is holding a controller as a scribe tool, and that the tip of the controller is against a (real or virtual) surface, the scribing controller 440 can cause writing to be implemented according to the movement of the tip of the controller. Additional details on using a controller as a scribe tool are provided below in relation to FIGS. 14 and 15.

User position controller 442 can monitor a user's location in the real-world, enable passthrough and other navigation features for the user to move between the real-world locations without having to remove her XR device, and change input modalities according to the user's current real-world location. Additional details on monitoring a user's movement between physical locations mapped to virtual input locations to control where the user appears in an artificial reality working environment and the input modalities the user has available, are provided below in relation to FIGS. 7 and 16.

Room configuration controller 444 can identify multiple desks corresponding to multiple users, select a room configuration (e.g., in response to a user selection or a room context), and arrange the user's desks according to the selected room configuration. In some implementations, room configuration controller 444 can automatically resize and adjust the artificial reality working environment room and the desk configuration to accommodate additional users who join the artificial reality working environment. Additional details on selecting and implementing room configurations for multiple desks in an artificial reality working environment are provided below in relation to FIGS. 17 and 18.

Environment auto-populator 446 can determine a context for a user prior to entering an artificial reality working environment and can auto populate the artificial reality working environment with content items and/or automatically add users to the artificial reality working environment based on the context. The context can be based on, for example, a thread the user was engaged in prior to entering the artificial reality working environment, content items the user was accessing prior to entering the artificial reality working environment, content items identified as favorites of the user, content items the user had active in a prior session in the artificial reality working environment, etc. The XR work system can provide multiple other controls for adding content items to an artificial reality working environment, such as a control the user can drag content items onto, a button in applications the user can activate to move a content item from that application into the artificial reality working environment, voice controls, or an interface between a computer screen streamed into the artificial reality working environment and the computer such that a user can perform a gesture to grab content items displayed on the computer screen and pull them into the artificial reality working environment. Additional details on automatically and manually adding content and people to an artificial reality working environment are provided below in relation to FIGS. 19 and 20.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
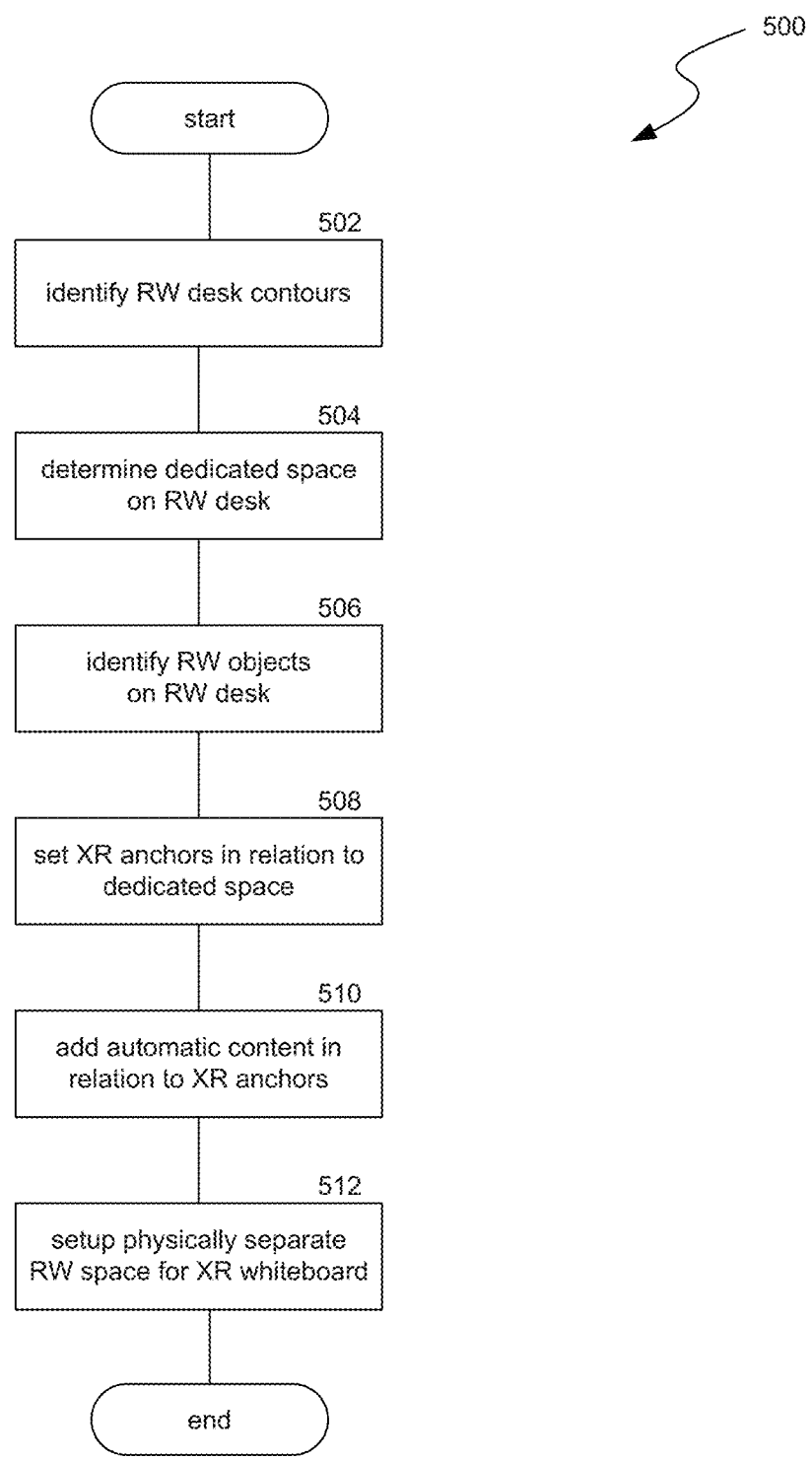
FIG. 5 is a flow diagram illustrating a process used in some implementations of the present technology for creating an artificial reality working environment.

FIG. 5 is a flow diagram illustrating a process 500 used in some implementations of the present technology for creating an artificial reality working environment with one or both of a desk space and/or a standing space. An example illustrating a desk space and a whiteboarding space is provided below in relation to FIG. 7. In some implementations, process 500 can begin when a user puts on a XR device and/or when the user activates an artificial reality working environment application on their XR device. In other implementations, process 500 can begin when a user activates a set-up or calibration process within an artificial reality working environment application.

At block 502, process 500 can begin establishing a desk space by identifying contours of a real-world desk to which the desk space will be linked. In some implementations, a height desk contour can be manually specified by user e.g., by placing her hand (which the XR device is tracking) or a tracked controller (e.g., controller 270) on the desk surface to specify a height of the top of the desk. The user can also trace an area or mark area corners on the real-world desk with her hand, controller, or a ray cast from her hand/or controller (e.g., while the XR device is in passthrough mode so the user can see the real-world desk). In some implementations, process 500 can automatically identify some or all of the desk contours, such as by employing computer vision (e.g., using regular and/or depth cameras) to identify a flat surface and its height; and/or by using a height determined for tracked objects placed on the real-world desk (e.g., a tracked keyboard, mouse, controller, etc.)

At block 504, process 500 can determine a dedicated space on the real-world desk. As with the desk contours, the dedicated space can be manually set by a user (e.g., by defining a rectangle on the top of the desk with the user's hands or controllers) or automatically (e.g., by using computer vision to identify an open area on the desk of sufficient size). In some implementations, and automatically identified dedicated space can be determined in relation to a position of a tracked keyboard or other tracked device on the real-world desk. In some implementations, a minimum amount of desk space can be required to set up the artificial reality working environment, and a warning can be provided if the specified dedicated space is not large enough. An example of a user specifying a dedicated space on his physical desk is provided below in relation to FIG. 6A.

At block 506, process 500 can identify real-world objects on the real-world desk. In some cases, the real-world objects can be tracked objects such as the keyboard, mouse, a laptop, or other "registered" objects. For example, various object manufacturers or the XR device owner can register particular objects to be recognized by the XR device, which can allow the XR device to identify and track the objects' positions. Registered objects can be identified using computer vision techniques for object recognition and/or can have a particular pattern applied to them to make identifying and tracking them more accurate. As a more specific example, a coffee mug can be registered with the XR system and have a particular design applied to it. Some tracked objects with output capabilities, such as a laptop or light-up keyboard (e.g., key backlighting or on-keyboard display), can be configured to output a particular light pattern, when being tracked by the XR device, which the XR device can identify to increase tracking accuracy. As another example, process 500 can track the position of a coffee mug, include a representation of the mug in the artificial reality working environment, and can enable selective pass-through near the mug when the user's hand approaches it, allowing the user to easily grasp the mug, take a drink, and put it back down without having to remove her XR device. In some implementations, an application on the user's computer can send a keyboard identifier to the XR device or the XR device can recognize the keyboard type from a captured image, allowing the XR device to render a corresponding keyboard model in the artificial reality working environment at the tracked location of the real-world keyboard.

In some implementations, the dedicated space can be required to be empty, or only include prespecified objects such as a tracked keyboard, and process 500 can provide a warning if the specified dedicated space contains other objects, e.g., a warning that such other objects may interfere with movements while in the artificial reality working environment. In some implementations, process 500 can continually monitor for intrusions by other objects (e.g., if your pet enters the dedicated space) and, when detected, provide a warning. In some implementations, a notification can be provided to the user to clear her desk area before beginning, without actively detecting whether or not there are objects in the dedicates space.

At block 508, process 500 can set XR anchors in relation to the dedicated space identified at block 504. XR anchors can be specific locations within the dedicated space for particular corresponding content items. For example a screen anchor can be set for a streamed version of the user's computer screen, anchors can be set for various UI controls to be placed around the dedicated space, various grids or surface patterns can be applied to the dedicated space to establish where content items will appear when added to the artificial reality working environment, etc. In some implementations, the XR anchors can be initially set to default locations and can be updated by the user to new desired locations.

At block 510, process 500 can add automatic content to the artificial reality working environment in relation to the anchors set at block 508. The automatic content can include representations of the tracked objects identified at block 506 (e.g., a keyboard, mouse, mug, etc.); a computer screen, which may be blank if the user has not yet authorized streaming of their computer screen into the artificial reality working environment (in some implementations, the screen is not displayed until a user activates a control to stream their screen into the artificial reality working environment); and/or content items selected for the artificial reality working environment (either automatically or manually see FIG. 19). At block 510, process 500 can also show additional controls and notification areas at corresponding XR anchors, such as an information bar (showing, e.g., the current time, time remaining in the meeting, meeting name, etc.) or controls for switching between artificial reality working environment areas; changing the room configuration; starting streaming of the users computer screen into the artificial reality working environment; turning on passthrough; a meeting tab (showing current information about the meeting and room, such as attendees, meeting description, and buttons for changing the layout of the room and exiting the room); a shared screen control (showing a local copy of any screen that is being shared to a current meeting); a settings or profile control (e.g., allowing the user to see and change her avatar, and configure other settings such as recalibrating the desk height or where the whiteboard appears in the whiteboard area, or choosing what type of keyboard to track); a mute/unmute control, a control to move between areas (e.g., to choose a different seat or move to the whiteboard area), a control to mirror the desk dedicated space to the whiteboard, etc. An example of automatic content added in a desk space according to XR anchors is provided below in relation to FIGS. 6B and 20.

At block 512, process 500 can set up a real-world space, physically separate from the desk area, for XR whiteboarding. The user can select the whiteboard space from the physical area around her desk. This whiteboard space can have specified footprint (e.g., 1.5 meters×2 meters) and process 500 can instruct the user to clear the space of other objects. In some cases, process 500 can warn the user if there is not enough space or if the selected space has objects which may endanger the user. In some implementations, the user can establish multiple of these whiteboard spaces adjacent to one another. This can allow the user to step between areas to use a large virtual whiteboard or different whiteboards, keeping the user's avatar, in the artificial reality working environment, centered in one of these areas without having to employ processing for fine-grained user position tracking. In some implementations, the whiteboard space must be adjacent to a wall or other flat vertical surface, allowing the user to have a physical service to write against where the writings appear on the whiteboard in the artificial reality working environment. In other implementations, the user can specify a virtual plane proximate to the specified whiteboard area where the whiteboard will appear in the artificial reality working environment, without having a physical surface for the user to write on. In some implementations, the whiteboarding space can be associated with multiple virtual whiteboards that can be activated or transitioned between to facilitate different conversations. For example, different projects can each have a dedicated whiteboard or various teams can have a shared team whiteboard.

In various implementations, a user can switch between their desk area and whiteboard area by activating a control and/or by standing up and physically moving between the corresponding real-world areas. Additional details on transitioning between the desk area and the whiteboard area are discussed below in relation to FIG. 16. In some cases, the XR device can activate pass-through mode if the user stands up or looks away from the dedicated space, and/or their virtual computer screen, or other virtual objects in the artificial reality working environment (e.g., another user who is presenting or the whiteboard).

Figure 6A:
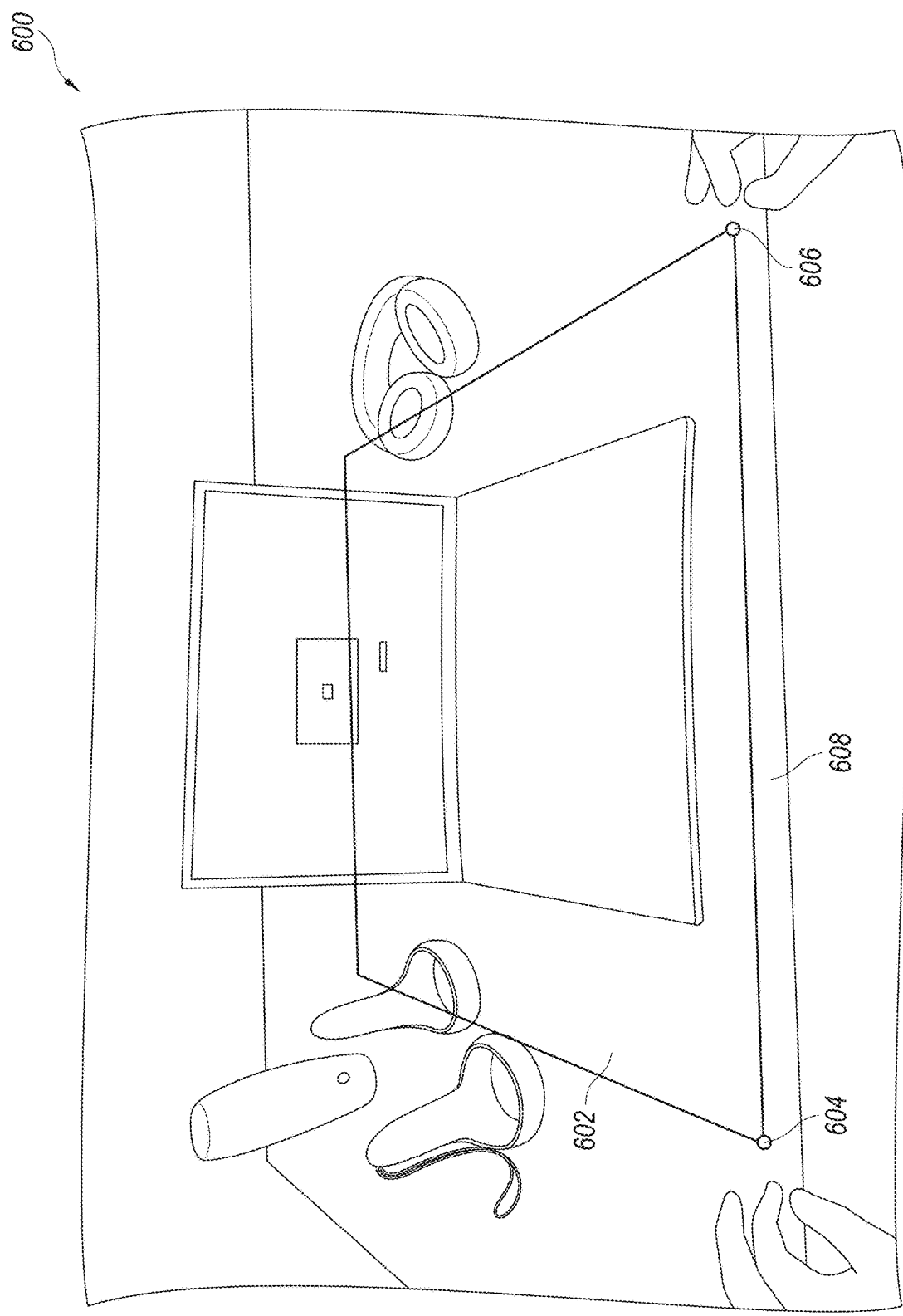
FIGS. 6A and 6B are conceptual diagrams illustrating an example of creating an artificial reality working environment linked to one or more real-world surfaces.
Figure 6B:
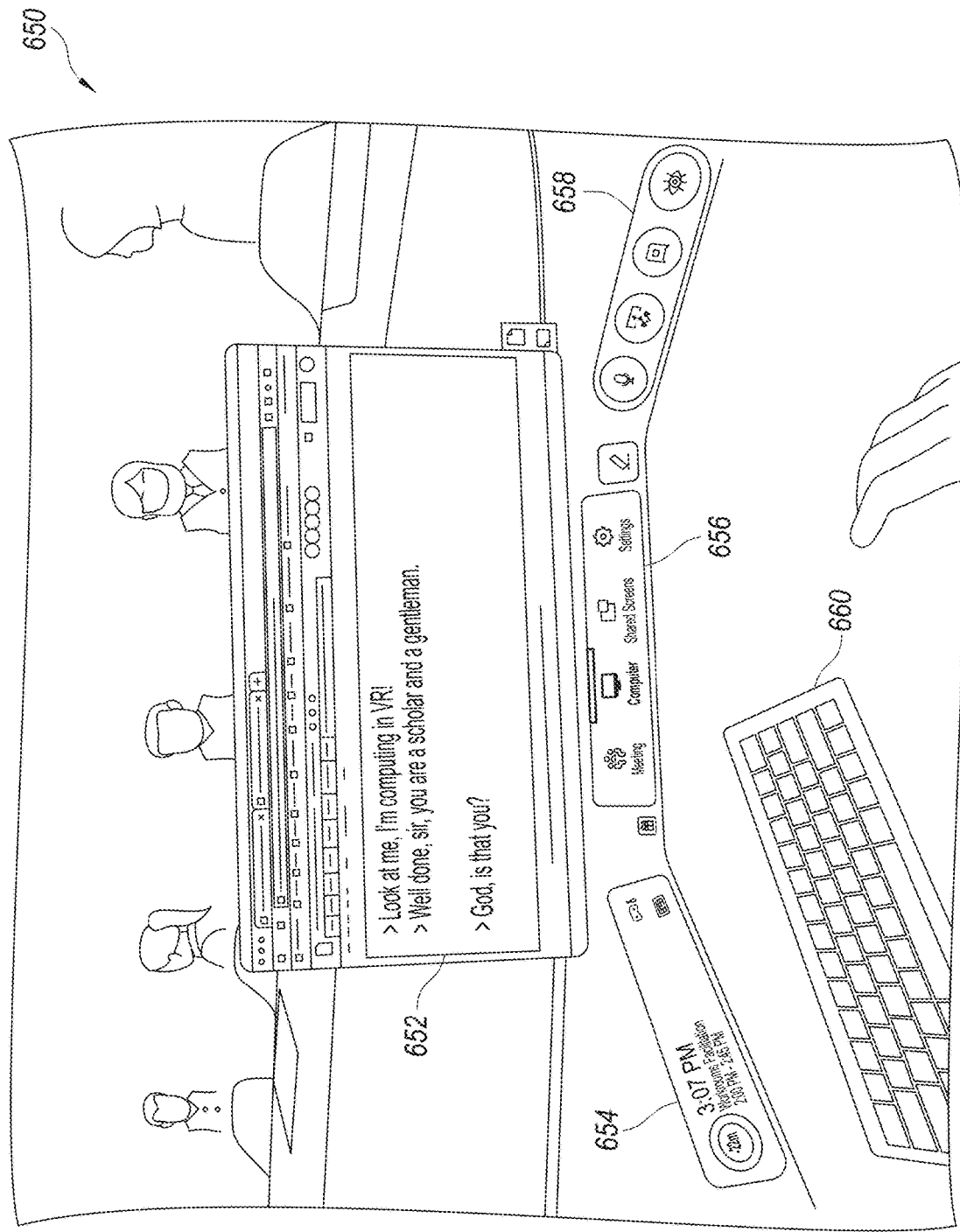

FIGS. 6A and 6B are conceptual diagrams illustrating an example of creating an artificial reality working environment linked to one or more real-world surfaces. FIG. 6A is a conceptual diagram illustrating an example 600 of the XR work system receiving input from a user specifying a dedicated space 602 on his physical desk 608. The XR work system accomplishes this by monitoring a user's hand positions to control corners 604 and 606. The user places these corners to specify a square of dedicated space and puts it at the height of the surface of his desk. FIG. 6B is a conceptual diagram illustrating an example 650 of a computer screen 652, control and notification bars 654, 656, and 658, and MR keyboard, which have been added in a desk space according to XR anchors. Once the dedicated space 602 has been specified, an initial, default anchor point for screen 652 and control and notification bars 654, 656, and 658 are set while an anchor point for MR keyboard 660 is set according to a tracked location of the user's real-world keyboard (which in this case, the user has moved off to the side of the dedicated space in the time between FIGS. 6A and 6B).

Figure 7:
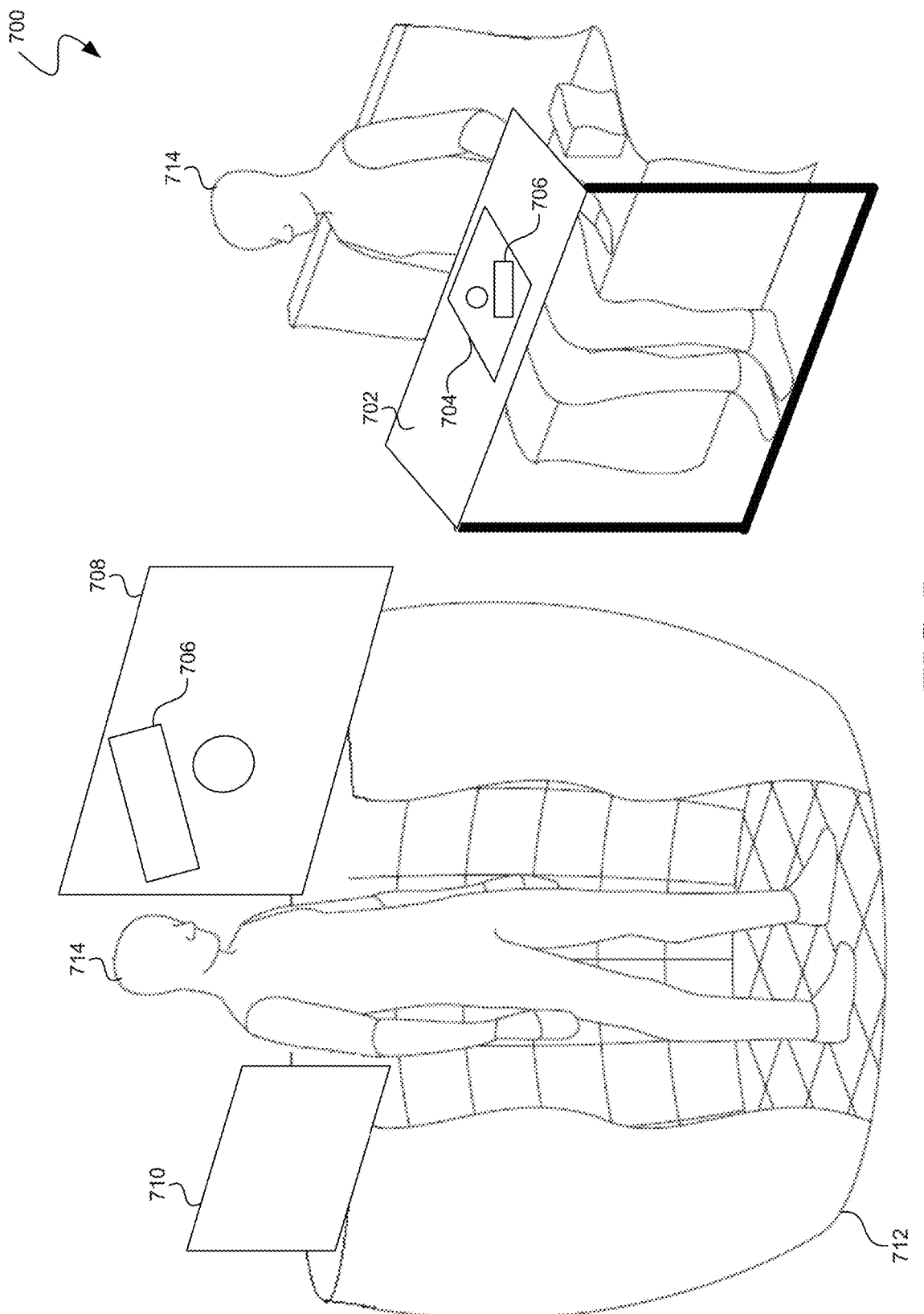
FIG. 7 is a conceptual diagram illustrating an example of creating an artificial reality working environment linked to multiple real-world spaces.

FIG. 7 is a conceptual diagram illustrating an example 700 of creating an artificial reality working environment linked to multiple real-world spaces. FIG. 7 includes a desk area 702 and a whiteboard area 712. The user 714 can move between the real-world areas to move into the corresponding linked artificial reality working environment areas, to perform actions specified for those areas. Desk area 702 includes a dedicated space 704 showing content items such as content item 706. Upon standing up and moving into the whiteboard area 712, whiteboard 708 is active, mirroring the content items (including content item 706) from the dedicated space 704. The user 714 can select other available whiteboards to interact with, such as a whiteboard 708, which is a team whiteboard including content items (not shown) automatically populated from a team working group.

Figure 8:
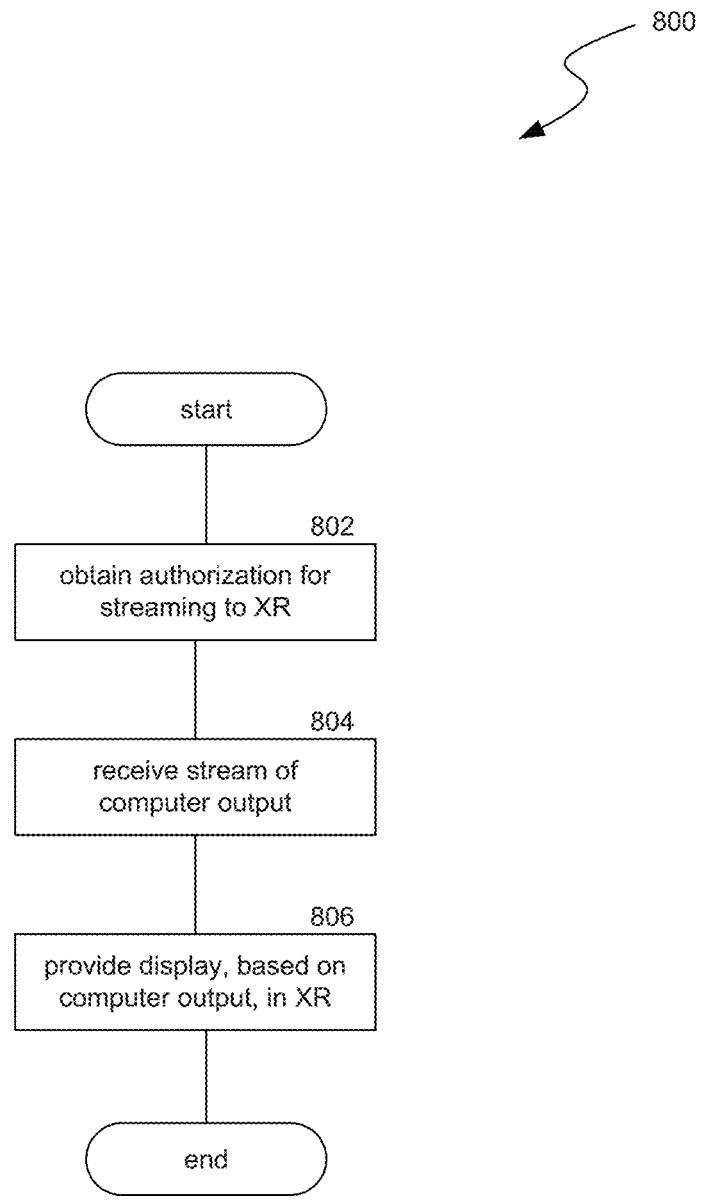
FIG. 8 is a flow diagram illustrating a process used in some implementations of the present technology for streaming a computer screen of a user into the artificial reality working environment.

FIG. 8 is a flow diagram illustrating a process 800 used in some implementations of the present technology for streaming the computer screen of a user into the artificial reality working environment. Process 800 can be initiated by a user activating a control while they are in an artificial reality working environment or prior to donning in XR device by activating a control in an application installed on their computer.

At block 802, process 800 can obtain authorization for streaming the user's computer screen into the artificial reality working environment. When process 800 is performed in response to a control in the application installed on the user's computer, authorization can be automatically assumed based on that action or through a notification provided to the user on the user's computer screen. When process 800 is performed in response to a control activated from inside the artificial reality working environment, it can be beneficial to obtain authorization through the user's computer without requiring the user to remove their XR device. This can be accomplished by, in response to activating the computer screen streaming control in the artificial reality working environment, sending a request to the application installed on the user's computer. The application on the user's computer can then display an authorization message in the foreground of the user's computer requesting authorization, where authorization can be approved with a single keyboard command (e.g., pressing enter). A notification can also be presented in the artificial reality working environment instructing the user to press enter on her MR keyboard. The user can move her hands toward the model of the keyboard displayed in the artificial reality working environment (which will also place her hands over her real-world keyboard) and press the authorization command (enter). An example of providing authorization for computer screen streaming without having to exit the artificial reality working environment is provided below in relation to FIGS. 9A and 9B.

At block 804, process 800 can receive a stream of output from the user's computer. In some implementations, a connection between the XR device and the user's computer can use a direct connection (e.g., bluetooth) or a local wireless network for fast streaming capabilities. In other circumstances, the stream can be facilitated by a server system (e.g., over the Internet). In some implementations, the streaming can be performed using RTC streaming. In various implementations, the streaming can be streaming of video of the user's computer screen, content that the XR device can use to re-create portions of the computer screen, or designated portions of the screen (e.g., particular windows or applications to display). In some cases, the application on the user's computer can provide multiple streams for each of multiple selected portions, such as a separate streams for each of different applications the user selects to stream into the artificial reality working environment.

In some cases, the application on the computer can tell the computer that multiple monitors are connected, causing the computer to enable a multiple monitor mode and the application can stream the content of each monitor into the artificial reality working environment. The application on the computer can also tell the computer what type of virtual display to create, for example changing resolution, size, refresh rate, dimensions, etc., for the virtual display, even when these parameters are different from the output the computer is providing to the real-world display. In some cases the application can obtain an angle of a real-world laptop screen which it can provide to the XR device, allowing the XR device to display the streamed user screen at the same angle in the artificial reality working environment.

In some implementations, the application can separately, and more frequently, report the position of the user's mouse on the screen from the rest of the stream. This allows process 800 to hide the mouse in the streamed content and render a more responsive mouse over the stream at the separately indicated locations.

At block 806, process 800 can display, based on the stream at block 804, computer output. This output can be displayed at one or more XR anchor points designated for displaying the user's screen. In some implementations, the user can move these anchor points to a new desired location. In some cases, a user can establish multiple screens in their artificial reality working environment, which can display mirror copies of the stream or different portions of the stream. For example, the user can specify how to segment the received stream into multiple screens that the user can position however they would like within the artificial reality working environment. Process 800 may also resize or reshape the incoming stream to fit a virtual screen placed in the artificial reality working environment.

Figure 9B:
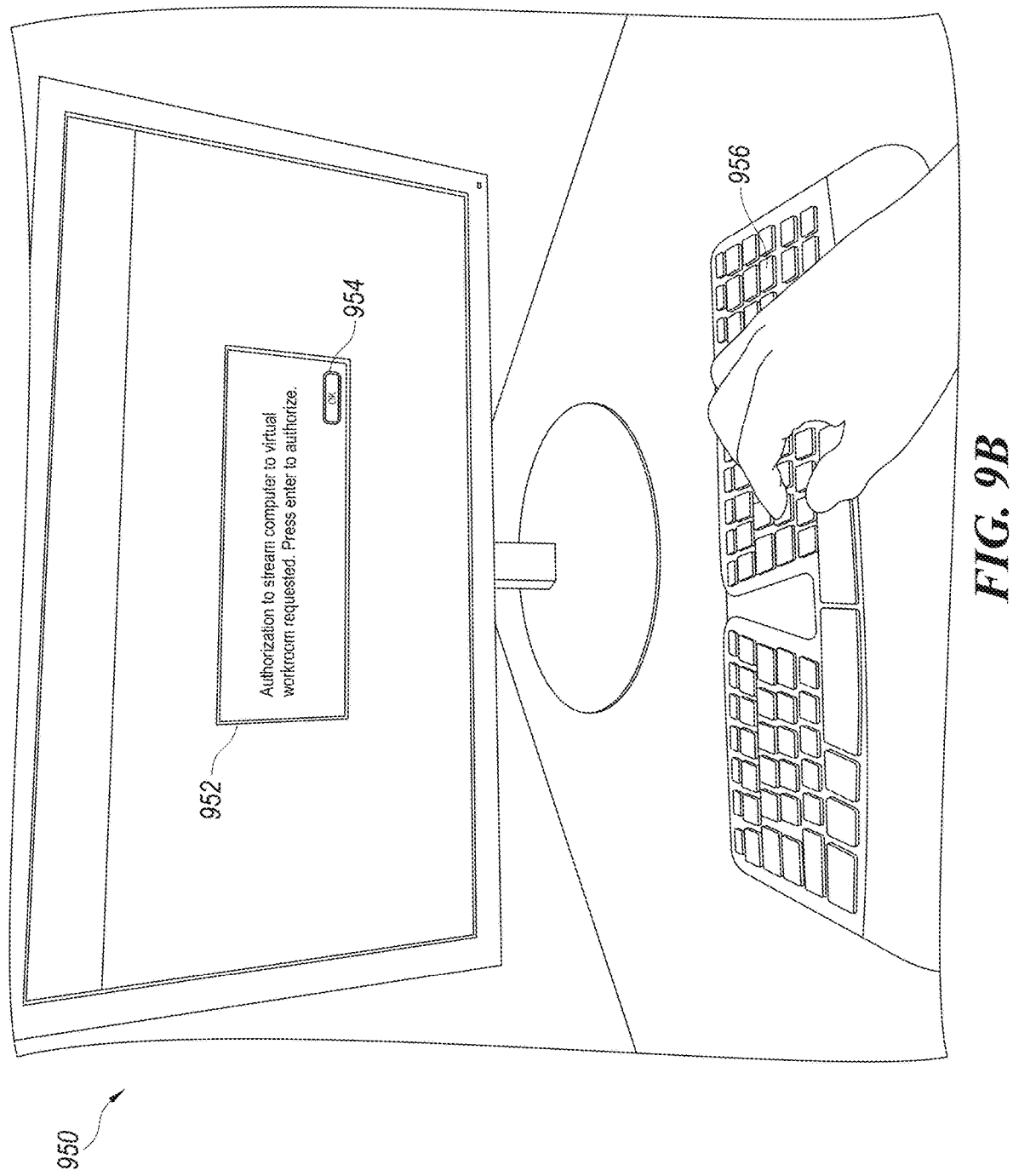

FIGS. 9A and 9B are conceptual diagrams illustrating an example of obtaining authorization, while in VR, for streaming a computer screen into the artificial reality working environment. FIG. 9A is a conceptual diagram illustrating an example 900 of what happens, inside an artificial reality working environment, for obtaining authorization to stream a computer screen into the artificial reality working environment. Example 900 begins following a user activating a control to request, while in an artificial reality working environment, her screen be streamed into the artificial reality working environment. A blank screen is shown with a message 902 telling the user to press enter on her MR keyboard 906 to authorize streaming her computer screen into the artificial reality working environment. The user places her hands 904 over her MR keyboard 906 (which transitions her hands into keyboard passthrough mode—in example 900, dotted line 908 indicates an area in which the camera feed of the user's hands are overlaid on the virtual environment such that the user can see images of her actual hands within this area), with which she presses enter on her keyboard. FIG. 9B is a conceptual diagram illustrating an example 950 of what happens, on the real-world computer, for obtaining authorization to stream the computer screen into the artificial reality working environment. Example 950 also begins following the user activating the control to request, while in the artificial reality working environment, her screen be streamed into the artificial reality working environment. An application on the computer causes a dialog box 952 to be presented in the foreground of the computer requesting authorization to stream the screen into the artificial reality working environment. The dialog box 952 includes an "OK" button, which can be activated to authorize the streaming by pressing enter on the user's keyboard. The user presses the enter button 956 on her keyboard, without having to take off her XR device, to authorize the streaming.

Figure 10:
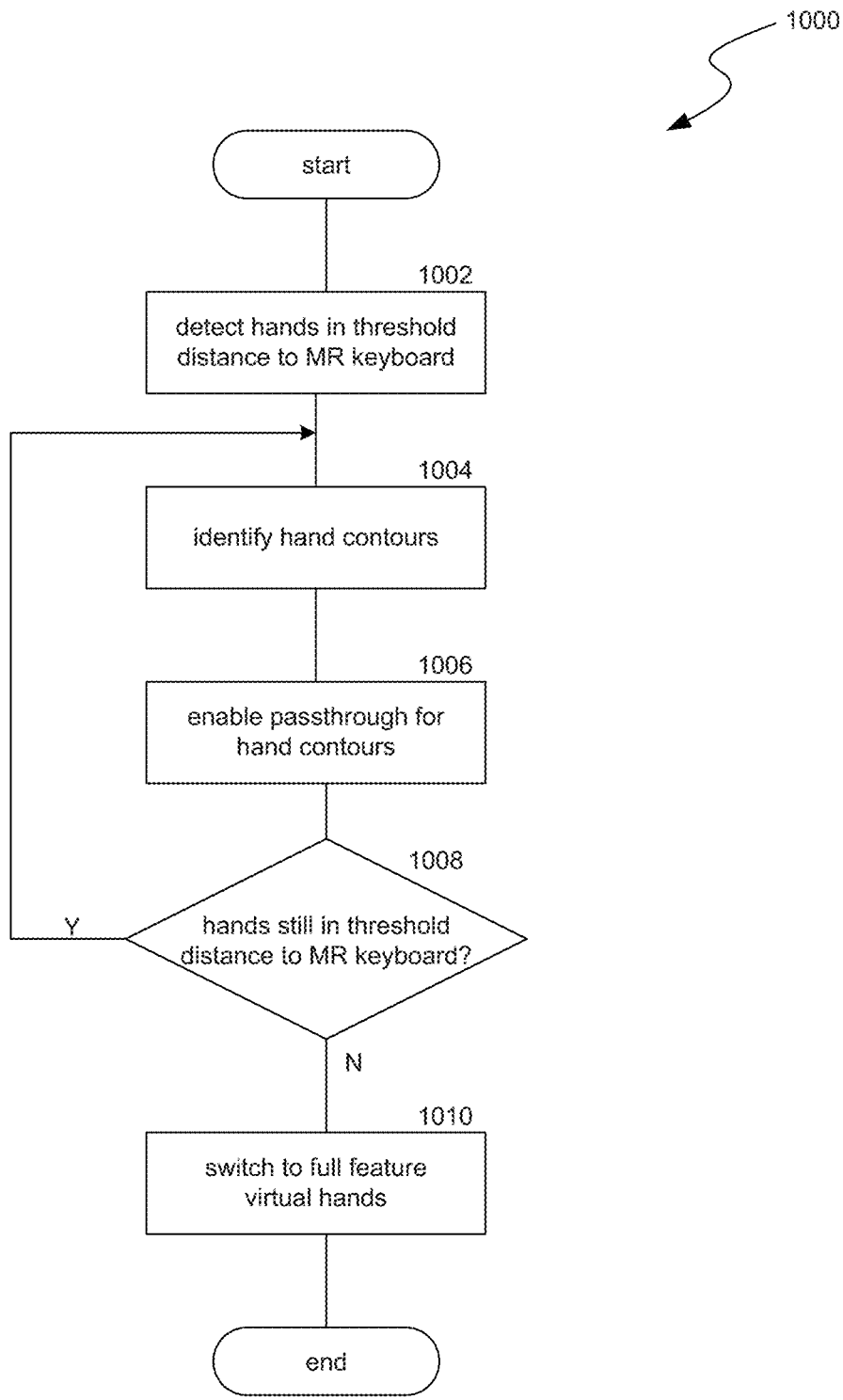
FIG. 10 is a flow diagram illustrating a process used in some implementations of the present technology for switching between hand states including a gesture hand state and a keyboard passthrough hand state.

FIG. 10 is a flow diagram illustrating a process 1000 used in some implementations of the present technology for switching between hand states including a gesture hand state and a keyboard passthrough hand state. Process 1000 can be available when a user enters an artificial reality working environment and can be triggered (at block 1002) according to monitored hand positions of the user. At block 1002, process 1000 can detect that the user's hand position is within a threshold distance (e.g., four inches) of the MR keyboard.

At block 1004, process 1000 can identify contours of the user's hands. For example, using machine vision techniques, a virtual model of the user's hands can be continually determined to identify, for example, the hand outlines, shape, position, etc. At block 1006, process 1000 can enable passthrough for the area inside (and in some cases, a set amount around) the outline of the hand. This allows the user to see the real-world version of just their hands while in the artificial reality working environment, which provides more precise movements in relation to the MR keyboard, allowing the user a natural and seamless way to use their keyboard while remaining in the artificial reality working environment. An example showing the user's hands in keyboard passthrough mode is provided below in relation to FIG. 11.

Process 1000 continues to monitor the user's hand position and contours and continues to and keep passthrough enabled for the updated hand contours until the user's hand position is determined, at block 1008, to be beyond the threshold distance from the MR keyboard. At that point, process 1000 at block 1010, disables the passthrough mode and returns to having the user's hands show as full-featured avatar versions of the user's hands (i.e., in gesture mode).

Figure 11:
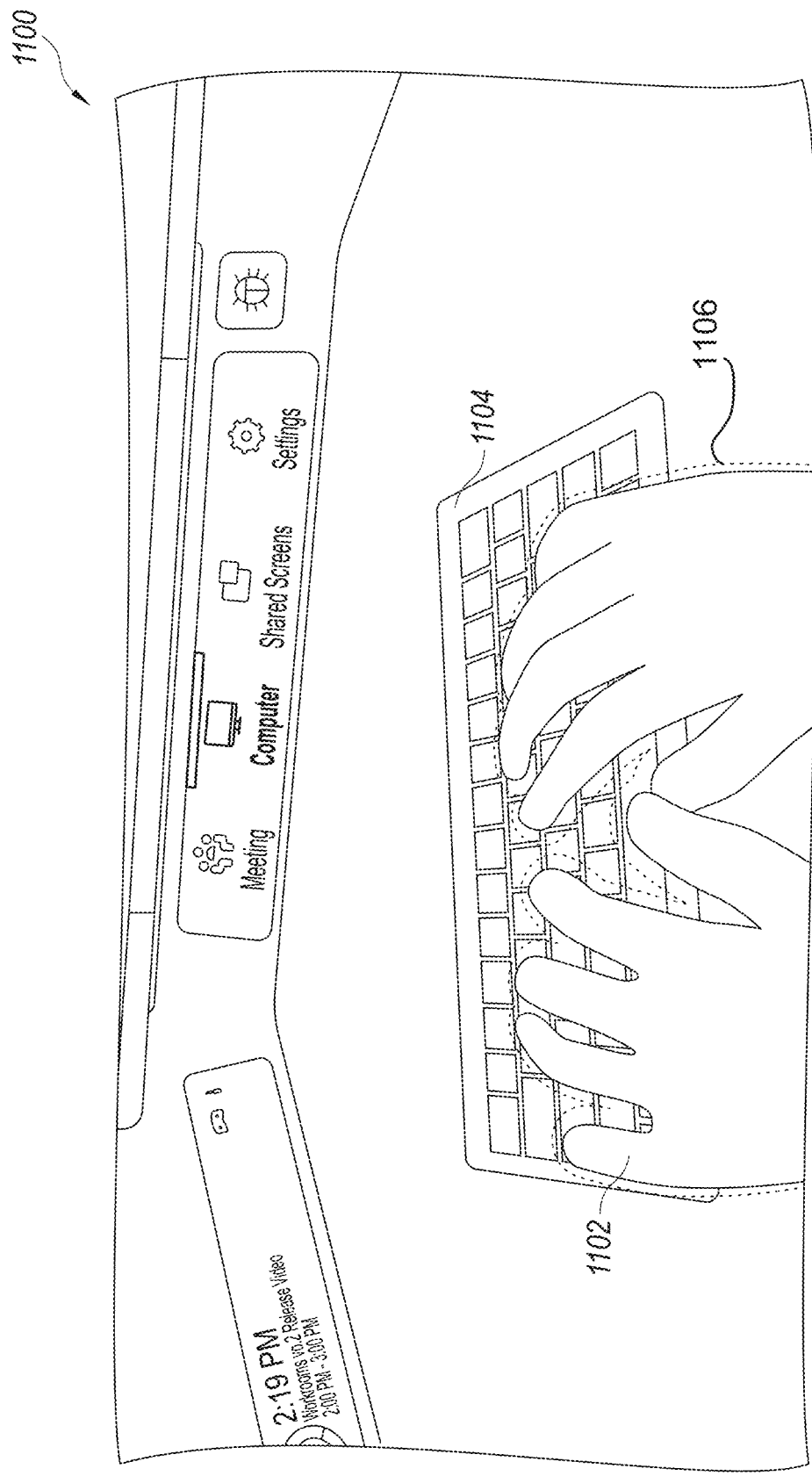
FIG. 11 is a conceptual diagram illustrating an example of facilitating keyboard input using the keyboard passthrough hand state.

FIG. 11 is a conceptual diagram illustrating an example 1100 of facilitating keyboard input using the keyboard passthrough hand state. The keyboard passthrough hand state was activated following the user moving her hands within a threshold distance of the keyboard 1104. In this mode, the XR work system tracks the contours of the user's hands 1102 and turns on passthrough inside and around those contours, allowing the user to see her real-world hands, over the keyboard, in the artificial reality working environment. In example 1100, dotted line 1106 indicates an area in which the camera feed of the user's hands are overlaid on the virtual environment such that the user can see images of her actual hands within this area. This provides the user with fine-grained control when interacting with her real-world keyboard, while remaining in the artificial reality working environment.

Figure 12:
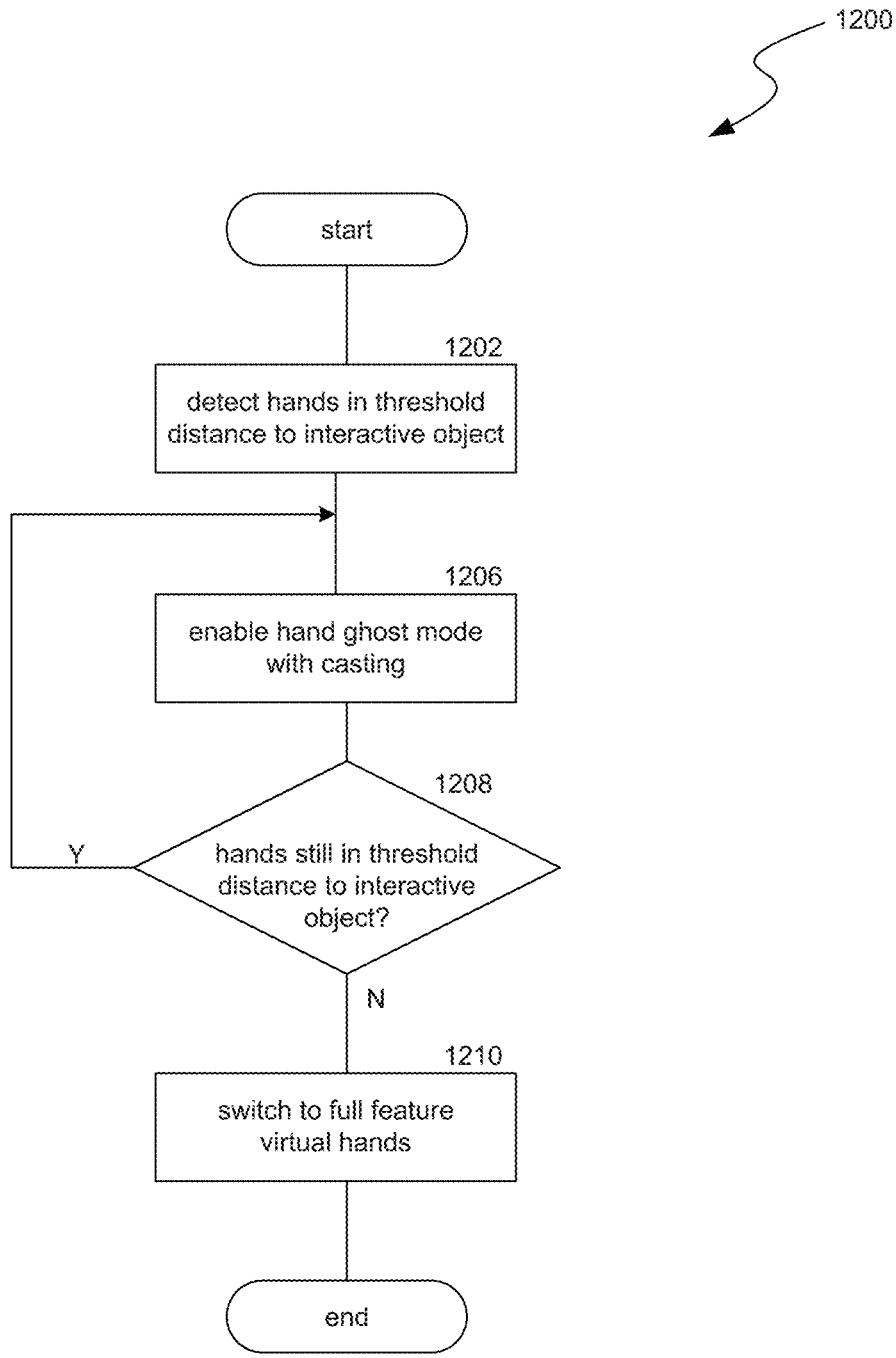
FIG. 12 is a flow diagram illustrating a process used in some implementations of the present technology for switching between hand states including a gesture hand state and a ghost interactive hand state.

FIG. 12 is a flow diagram illustrating a process 1200 used in some implementations of the present technology for switching between hand states including a gesture hand state and a ghost interactive hand state. Process 1200 can be available when a user enters an artificial reality working environment and can be triggered (at block 1202) according to monitored hand positions of the user. At block 1202, process 1200 can detect that the user's hand position is within a threshold distance (e.g., ten inches) of an interactive object. An interactive object is any object with which the user can produce some effect, such as by selecting the object, moving the object, activating controls on the object, etc. In some implementations, a visual affordance can be provided to indicate to the user as they get closer to objects that can be manipulated. For example, the user's hand can fade from the normal, full-featured, gesture mode into an opaque ghost mode as the user's hand approaches an interactive object. An example of the transition from the normal gesture mode to the ghost mode as the user's hand approaches an object is provided below in relation to FIGS. 13A-C.

At block 1206, process 1200 can enable ghost interactive mode. In this mode, users can interact with objects in the artificial reality working environment. In some implementations, in this mode a ray can be cast from the user's hand, allowing the user to interact with objects without having to be close enough to actually touch them.

Process 1200 continues to monitor the user's hand position until the position is determined, at block 1208, to be beyond the threshold distance from all interactive objects. At that point, process 1200 at block 1210, returns to having the user's hands show as full-featured avatar versions of the user's hands (i.e., in gesture mode).

Figure 13A:
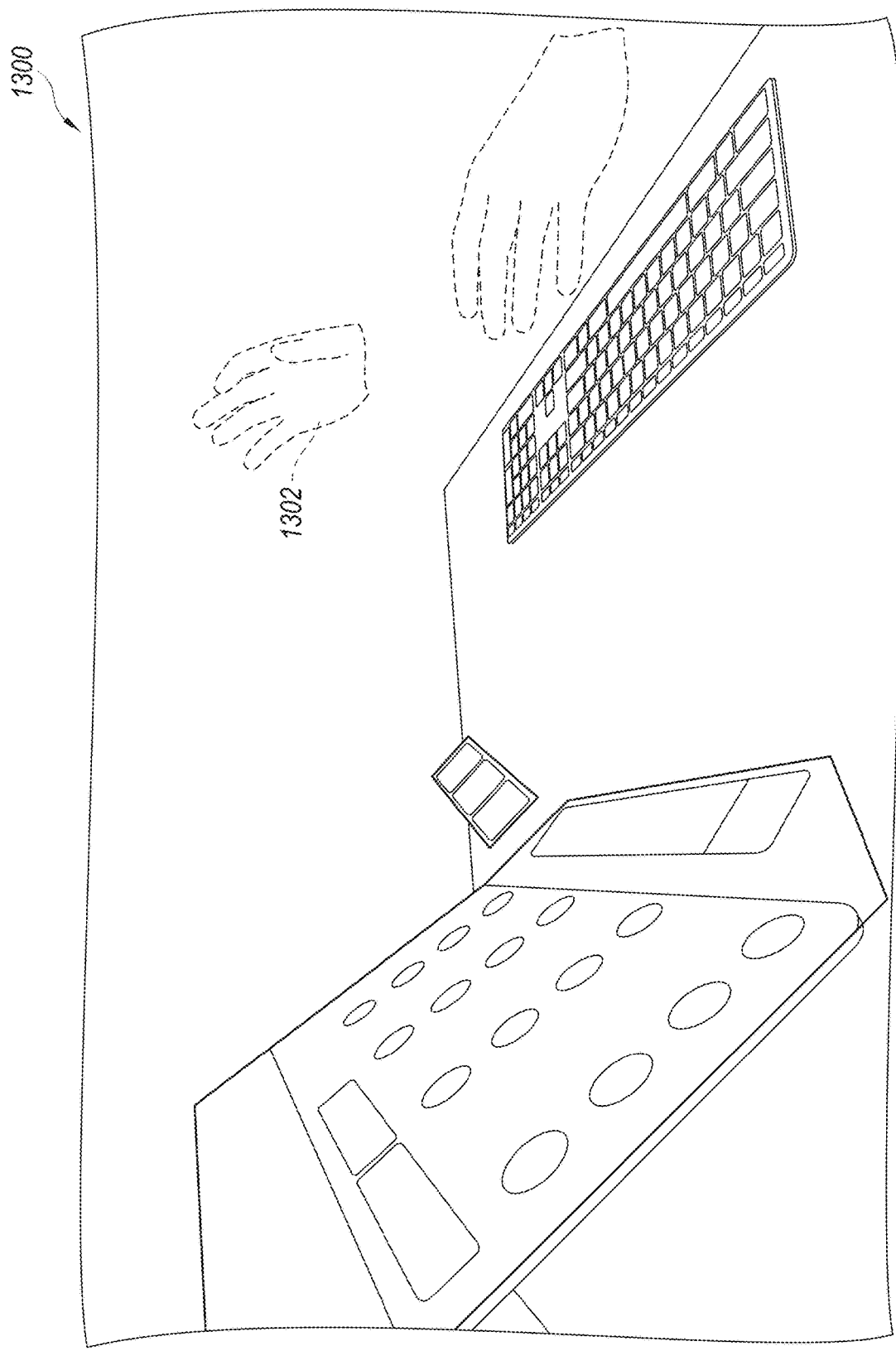
FIGS. 13A-13C are conceptual diagrams illustrating an example of transitioning from gesture hand state to ghost interactive hand state.
Figure 13B:
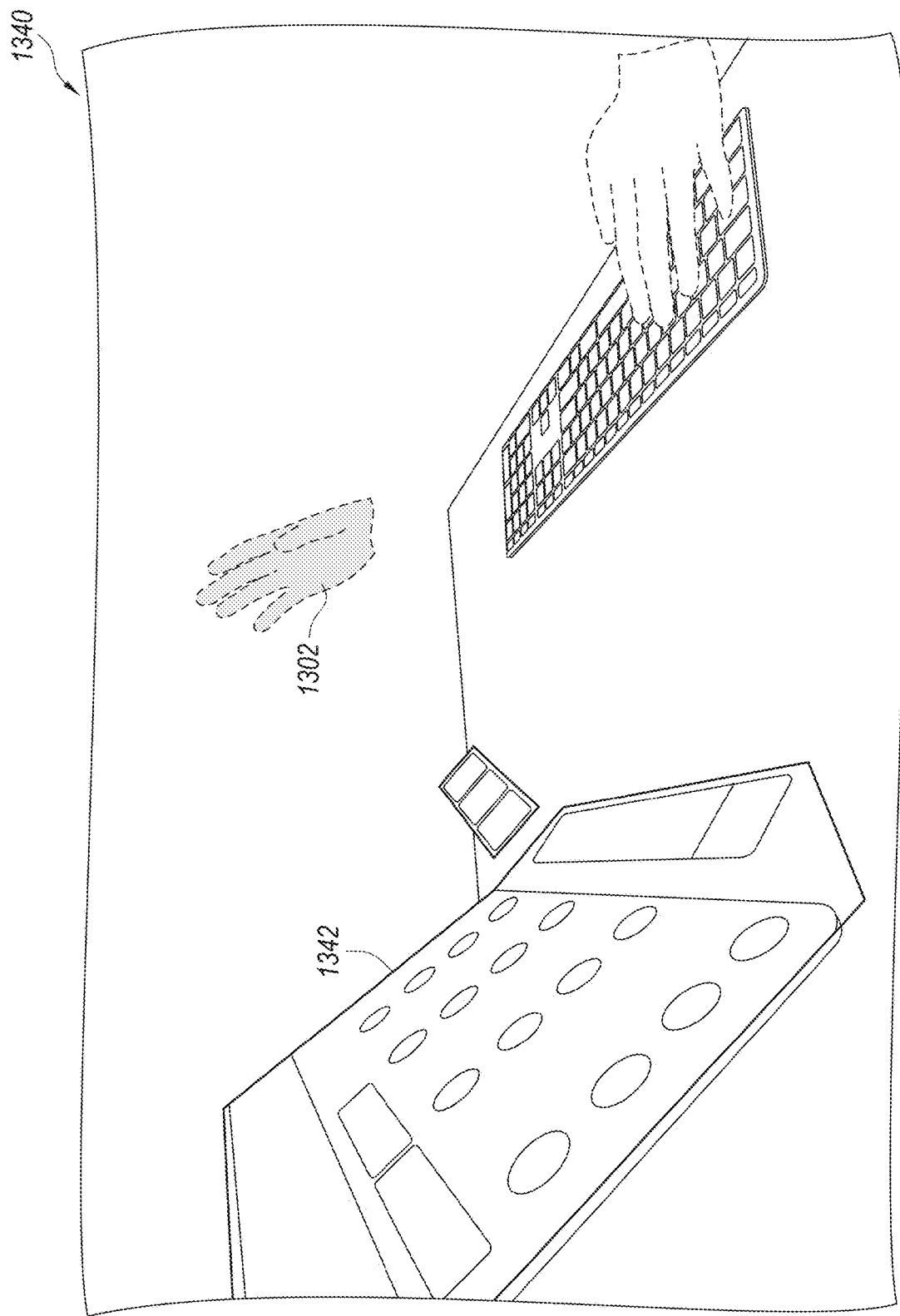
Figure 13C:
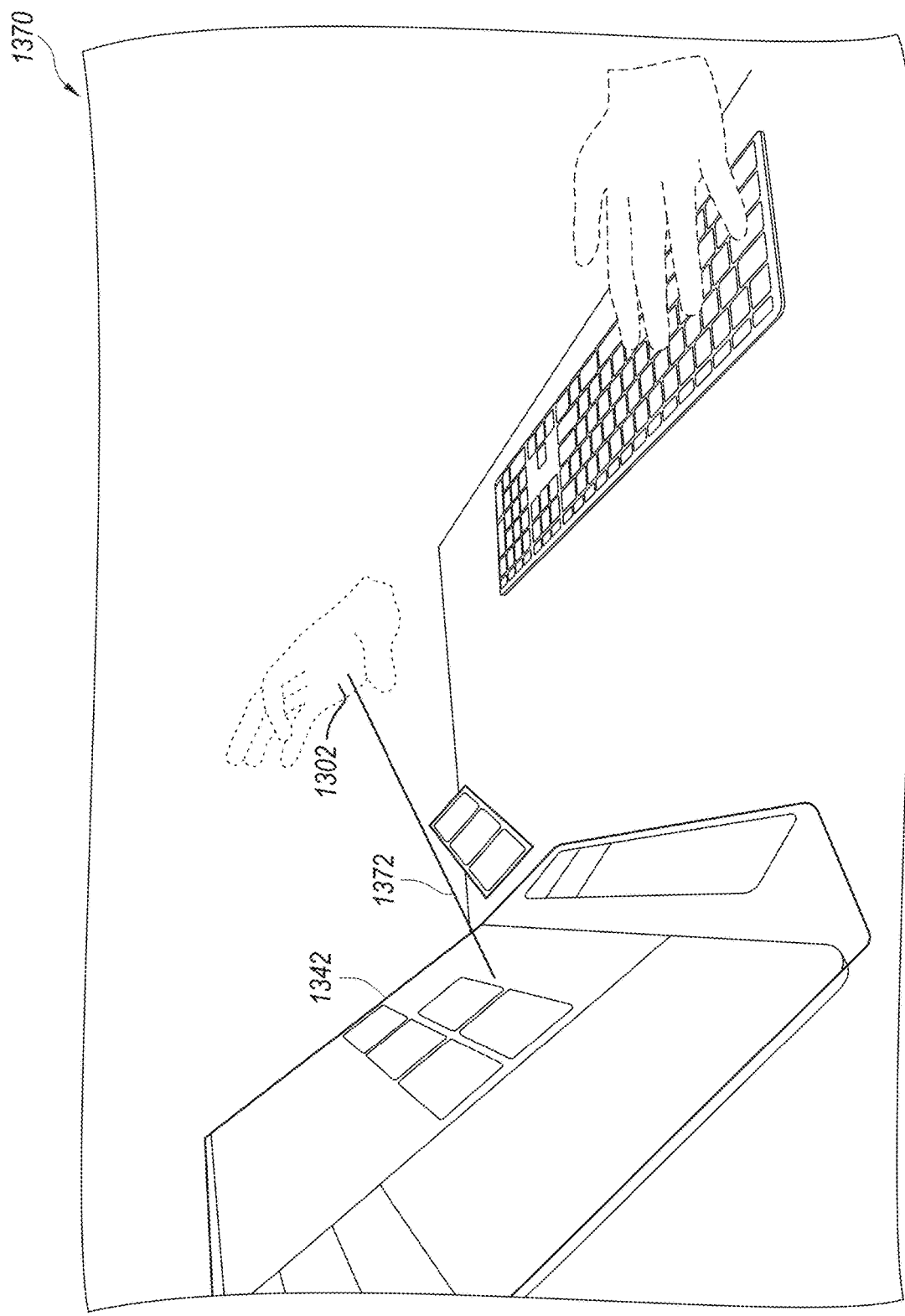

FIGS. 13A-13C are conceptual diagrams illustrating an example of transitioning from gesture to ghost interactive hand state. FIG. 13A is a conceptual diagram illustrating an example of transitioning from gesture to ghost interactive hand state where the user's hand 1302 is still in gesture mode. The dashed line in FIG. 13A indicates the user's hands are in gesture mode—e.g., they are shown as models of hands with a flesh texture. FIG. 13B is a conceptual diagram illustrating an example of transitioning from gesture to ghost interactive hand state where the user's hand 1302 is still in gesture mode (as indicated by the dashed line), but a visual affordance is applied (in this example shown as shading) to indicate to the user that the user is approaching an interactive object 1342, which will transition her hand to the ghost interactive hand state if the user's hands get closer. FIG. 13C is a conceptual diagram illustrating an example of transitioning from gesture mode to ghost interactive hand state (here indicated by the hand being shown with a dotted line) where the user hand 1302 is within the threshold distance of the interactive object 1342, and thus have transitioned to the ghost interactive hand state. In the ghost interactive hand state, the user's hand 1302 can interact with the interactive object 1342 and casts a ray 1372, which the user can direct at the interactive object 1342 to further interact with it. In some implementations, the ghost interactive hand state can be illustrated by showing the user's hand in shades of gray and/or as partially transparent.

Figure 14:
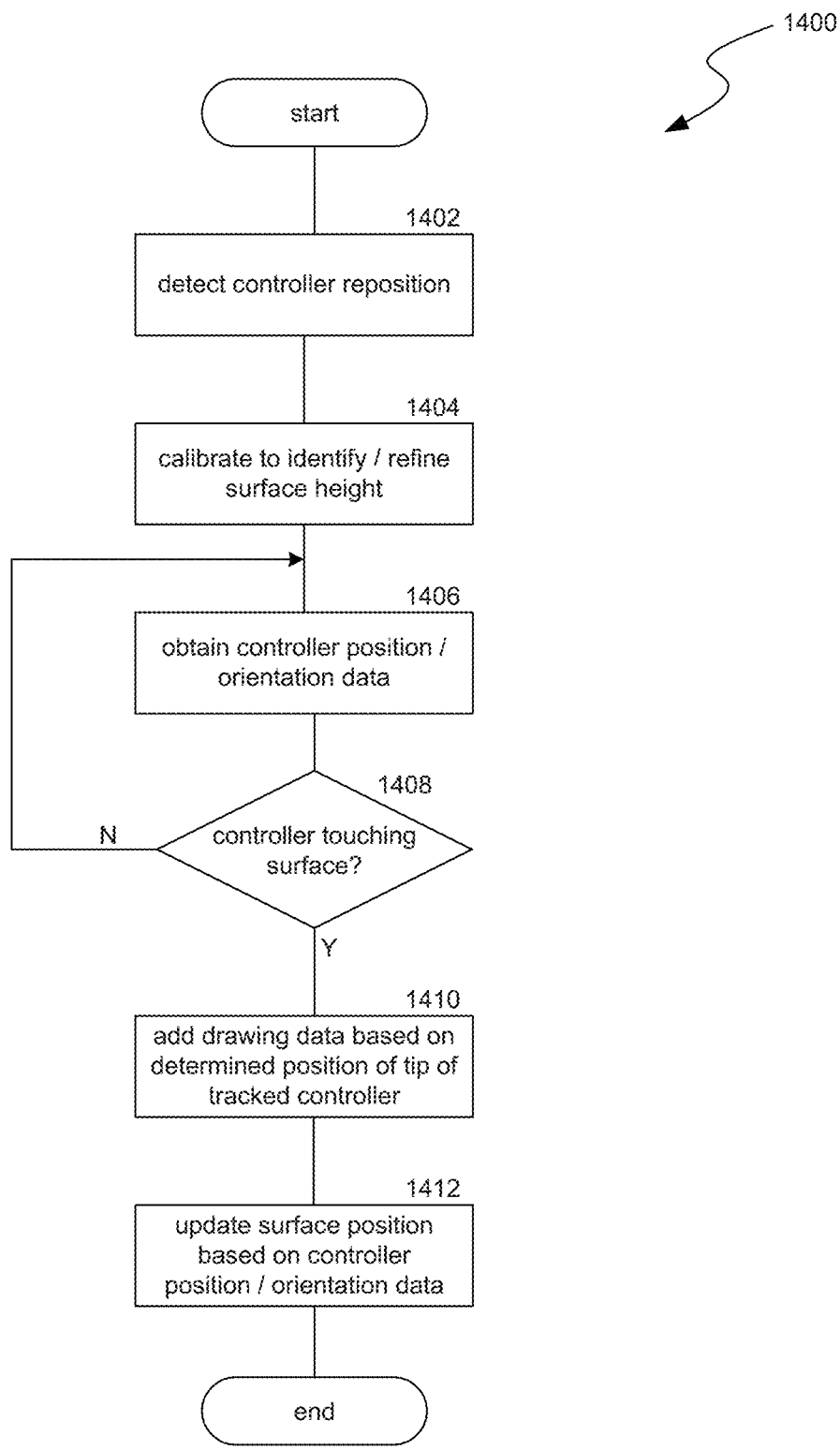
FIG. 14 is a flow diagram illustrating a process used in some implementations of the present technology for using a physical controller as a scribe tool, in an artificial reality working environment, on a real-world surface.
Figure 15A:
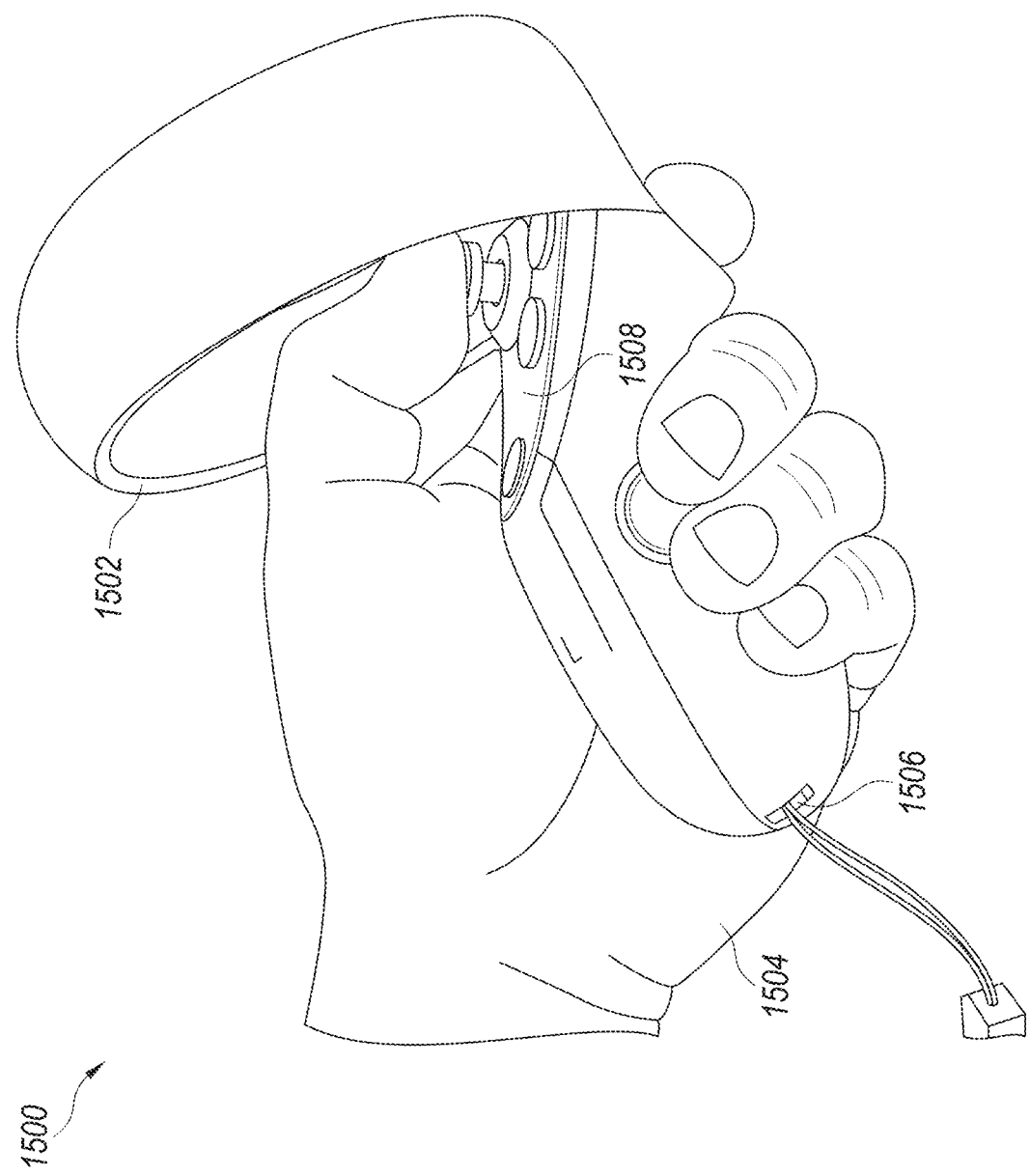
FIGS. 15A-15E are conceptual diagrams illustrating an example of transitioning to using a physical controller as a scribe tool in the artificial reality working environment.
Figure 15B:
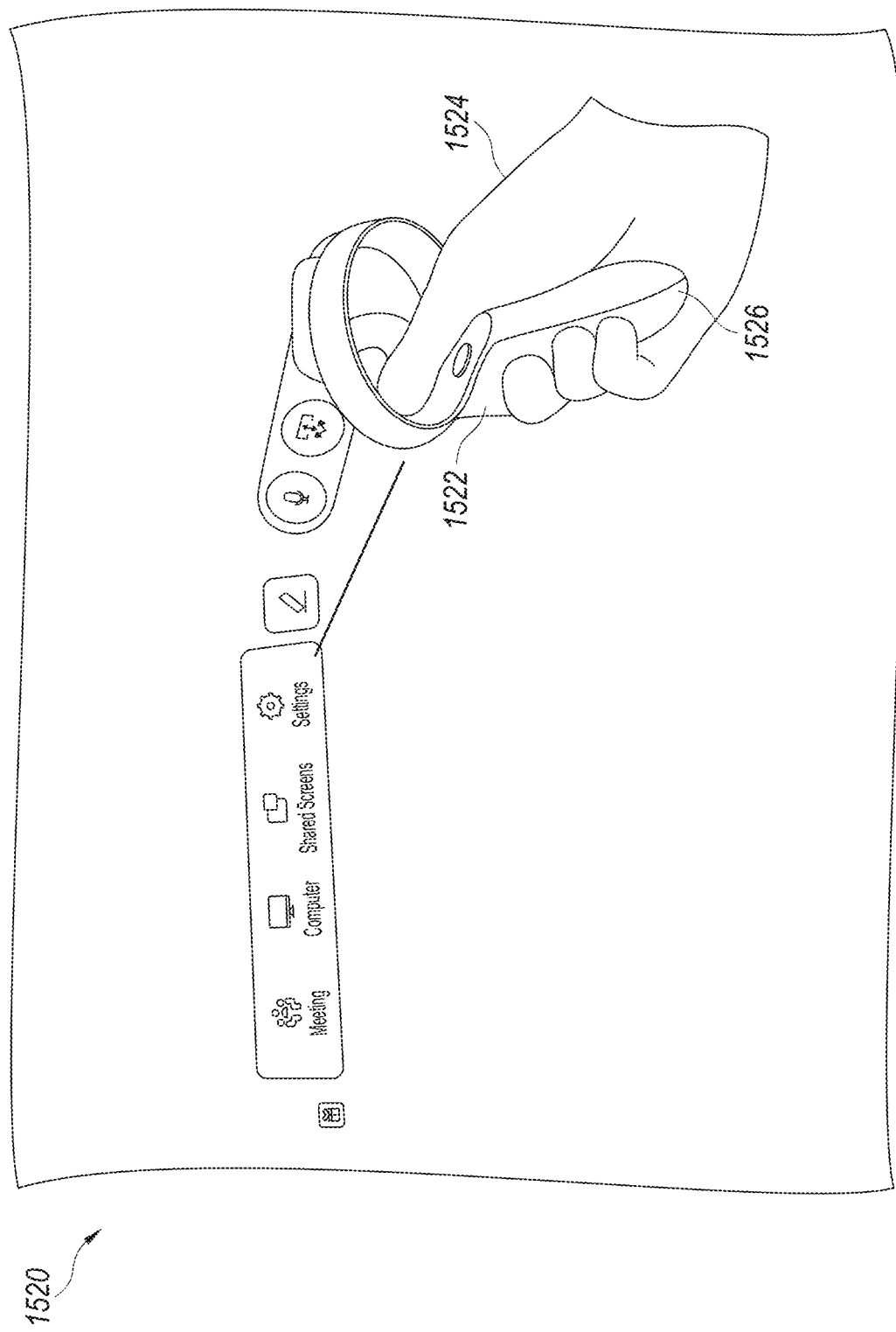
Figure 15C:
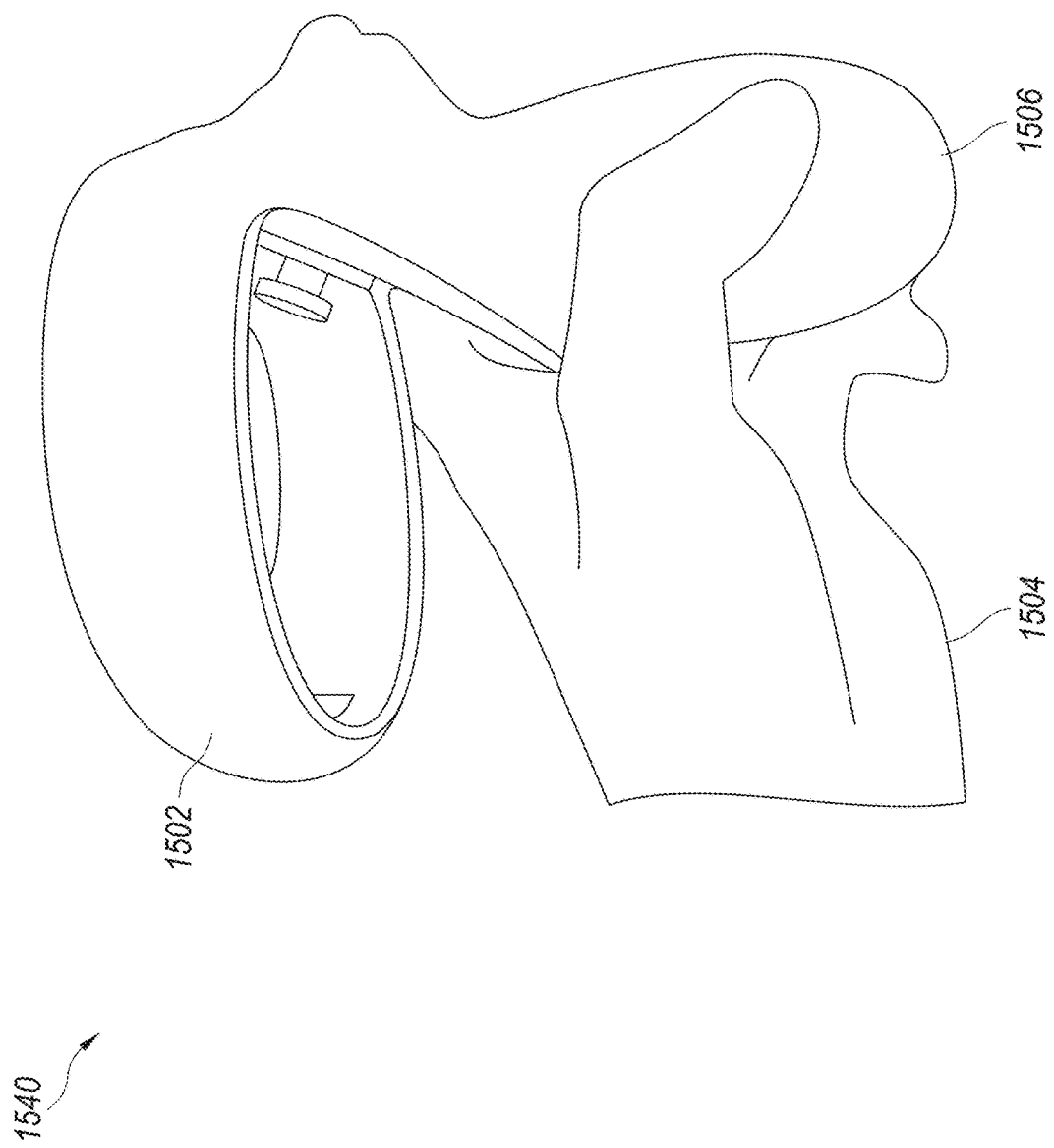

FIG. 14 is a flow diagram illustrating a process 1400 used in some implementations of the present technology for using a physical controller (e.g., controller 270) as a scribe tool, in an artificial reality working environment, on a real-world surface. Process 1400 can be available when a user enters an artificial reality working environment and can be triggered (at block 1402) according to monitored controller positions and orientations. At block 1402, process 1400 can detect a controller reposition from normal mode to scribe mode. For example, these modes can be determined according to the direction of buttons on the controller, the tilt of the controller, monitored positions of the user's hands in relation to the controller, and how close a tip of the controller is to the dedicated space on the user's desk. For example, the normal mode can be indicated when the controller tilt is above a threshold and the user's fingers are positioned over buttons, whereas the scribe mode can be detected the tilt is below the threshold and the tip of the controller is within a threshold (e.g., three inches) of the desk surface. FIGS. 15A-15C, discussed below, illustrate examples of changing between a user holding a controller in a normal mode versus a scribe mode.

Figure 15D:
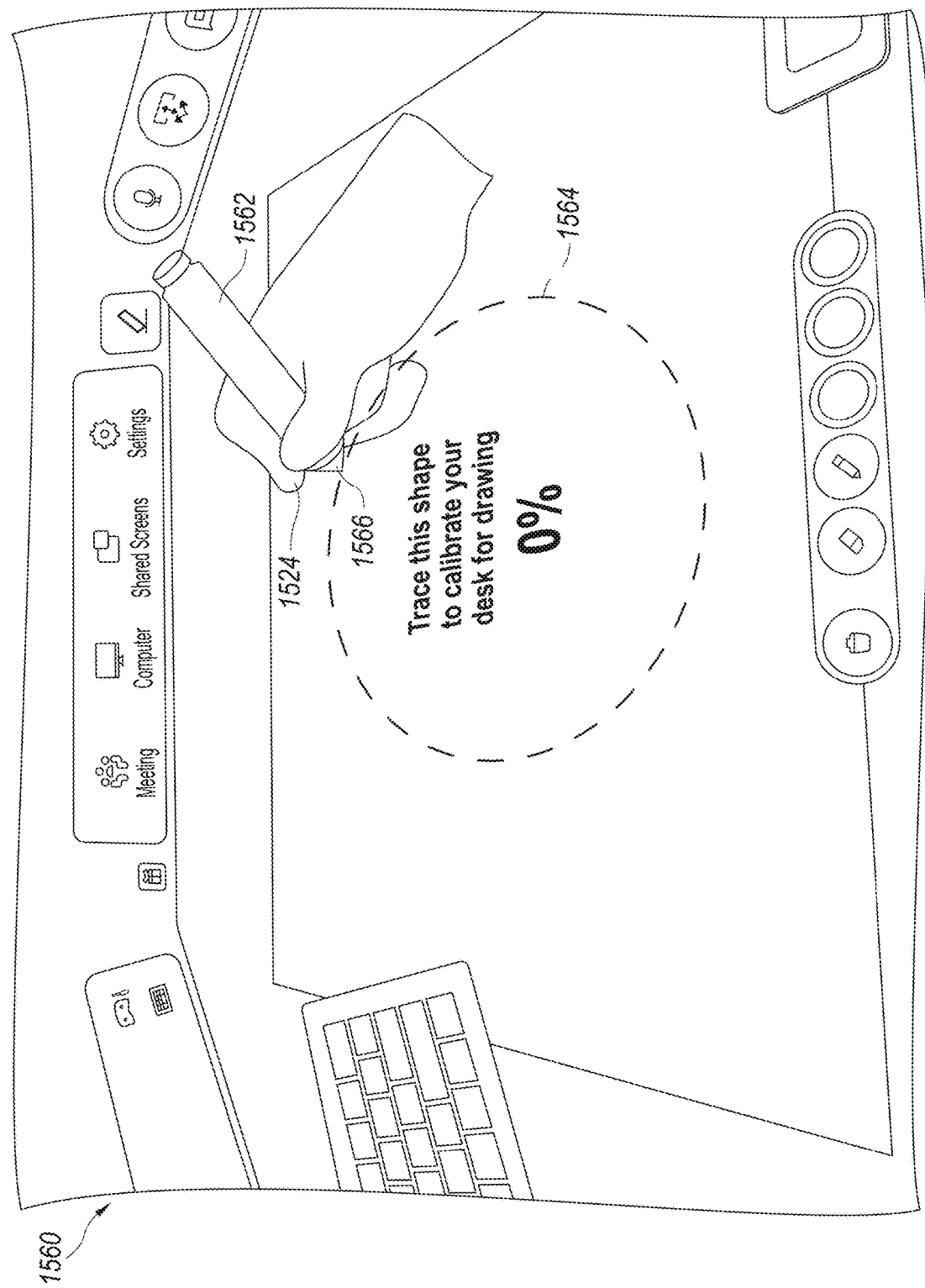

At block 1404, process 1400 can perform a calibration to identify or refine a surface height of the dedicated space on the user's desk. This can include instructing a user to keep the controller tip in contact with a surface and trace a circle. Using telemetry from the controller that can pinpoint where the tip of the controller is, the height of the tip is determined at multiple points as the user traces the circle. Process 1400 can fit these points to a virtual plane that defines the surface height. FIG. 15D, discussed below, illustrates an example calibration procedure to refine a surface height. In some cases, block 1404 can be skipped—e.g., if a calibration was recently performed within a threshold amount of time (e.g., 10 minutes).

At block 1406, process 1400 can monitory controller position and orientation data. A version of block 1406 can also be performed during controller repositioning (block 1402) and/or calibration (block 1404). This data can be used to determine an exact position of the tip (e.g., tip 276 in FIG. 2C) of the controller. This data can be based on the IMU data from the controller, tracked light emitted by the controller, a camera on the XR device or an external camera tracking a position of the controller, etc.

At block 1408, process 1400 can determine whether the tip of the controller is touching the surface of the desk. In various implementations, this determination can be based on one or more of: the position data determined at block 1406 as compared to the calibrated surface height, whether the position of the tip is staying on a consistent plane (e.g., a user not pressing against a hard surface is unlikely to maintain a consistent plane as she moves a controller), whether the controller detected a jolt corresponding to the controller coming in contact with a surface, or whether there is a pattern of vibration consistent with a controller being dragged across a surface. In some implementations, the controller tip can be equipped with a hardware pressure sensor that can indicate to the system whether the controller tip is being pressed against a surface (and how hard, which can change how much saturation the system allocates to drawing movements). If process 1400 determines that the controller is not touching the surface, it returns to block 1406 to continue monitoring the controller position. If process 1400 determines that the controller is touching the surface, it continues to block 1410.

At block 1410, process 1400 can add drawing data based on the determined position of the tip of the tracked controller. This drawing data can be added to any number of documents, surfaces, or models, depending on what was on the desk surface where the user was scribing. For example, if no documents were presented on the desk surface, the drawing data can be saved as notes to be shown on the desk surface, whereas if a document was present on the desk surface where the user was scribing, the drawing data can be added to the document.

At block 1412, process 1400 can update the position of the surface height based on the determined position of the tip of the controller as the user was drawing. As the user continues to draw, multiple points can be tracked for the position of the controller tip, and similarly to the calibration step in block 1404, those points can be fit to a plane to refine the surface height. This continual adjustment of the surface height can help prevent drift that can occur for virtual objects in an artificial reality environment.

FIGS. 15A-15E are conceptual diagrams illustrating an example of transitioning to using a physical controller as a scribe tool in the artificial reality working environment. FIG. 15A is a conceptual diagram illustrating an example 1500 of holding a controller normally, as shown in the real-world. In example 1500, the controller 1502 is held in the user's hand 1504 at an angle, with the user's thumb over one of the controller's button area 1508. The controller tip 1506 is also facing toward the user. FIG. 15B is a conceptual diagram illustrating an example 1520 of holding a controller normally, as shown in an artificial reality working environment. The virtual controller 1522 is illustrated as held in a manner matching example 1500—with the user's virtual hand 1524 holding the virtual controller 1522 at an angle with the controller tip 1526 also facing toward the user.

FIG. 15C is a conceptual diagram illustrating an example 1540 of holding a controller as a scribe tool, as shown in the real-world. In example 1540, the controller 1502 is held in the user's hand 1504 more vertically than in example 1500, with the user's holing the tip end of the controller 1506 between her thumb and one or more fingers, with the tip facing downward.

Figure 15E:
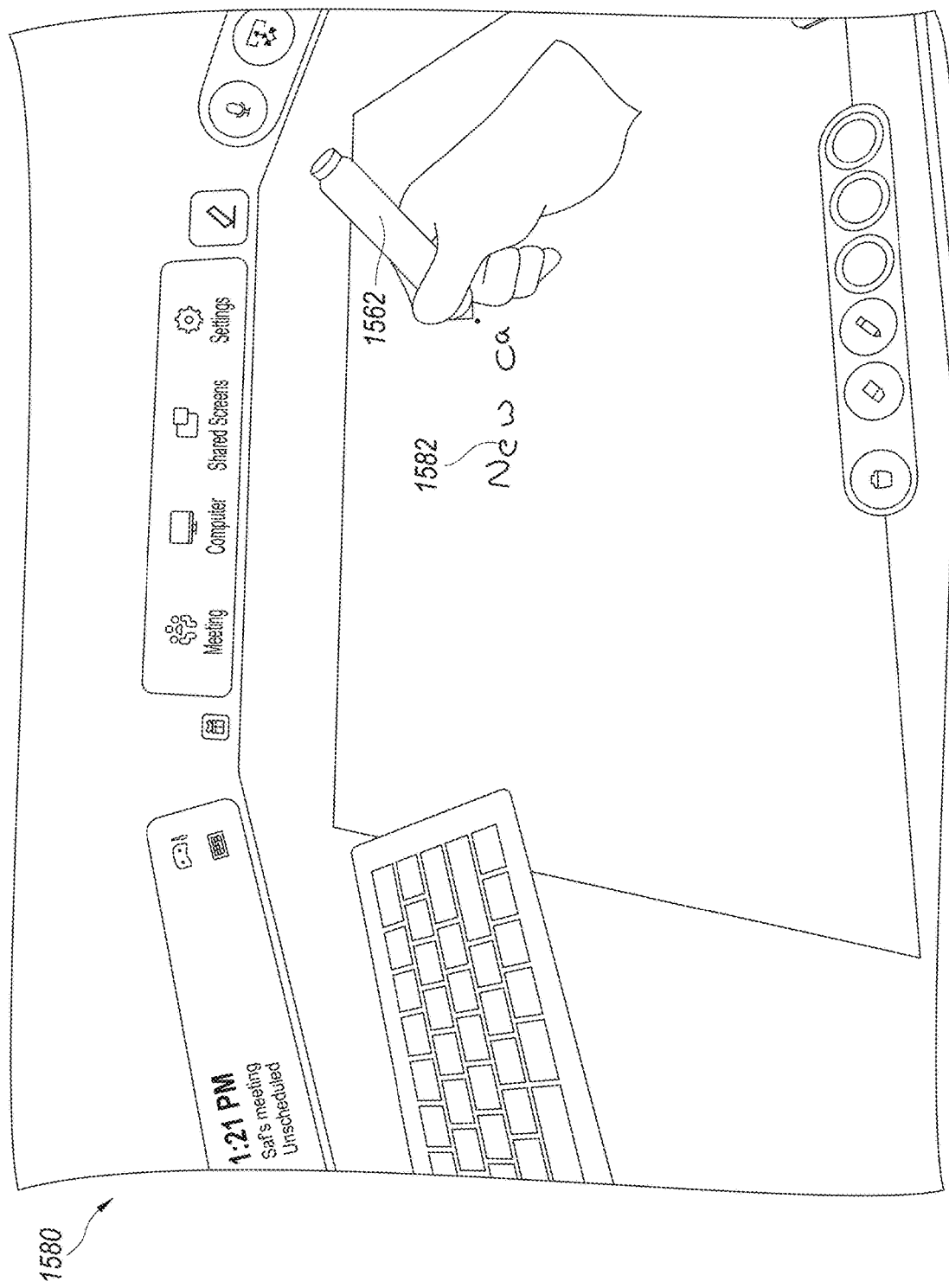

FIG. 15D is a conceptual diagram illustrating an example 1560 of holding a controller as a scribe tool, as shown in an artificial reality working environment. In example 1560, the virtual controller, in response to the system recognizing the controller is being held as a scribe tool, is displays as a scribe tool/writing implement 1562 in the user's virtual hand 1524. To calibrate the surface of the desk for use by the scribe tool, the XR work system instructs the user to trace circle 1564 with the scribe tool tip 1566. FIG. 15E is a conceptual diagram illustrating an example 1580 of using the controller as a scribe tool 1562, in the artificial reality working environment, to create drawing 1582 by dragging the controller tip 1506 across the desk surface in the dedicated space. In some cases, such scribing can be performed by brining the controller (or another scribing implement or the user's hand) in contact with the physical desk surface; while in other cases the scribing can be performed by intersecting the controller (or another scribing implement or the user's hand) with a virtual plane defined in the air in the artificial reality environment.

Figure 16:
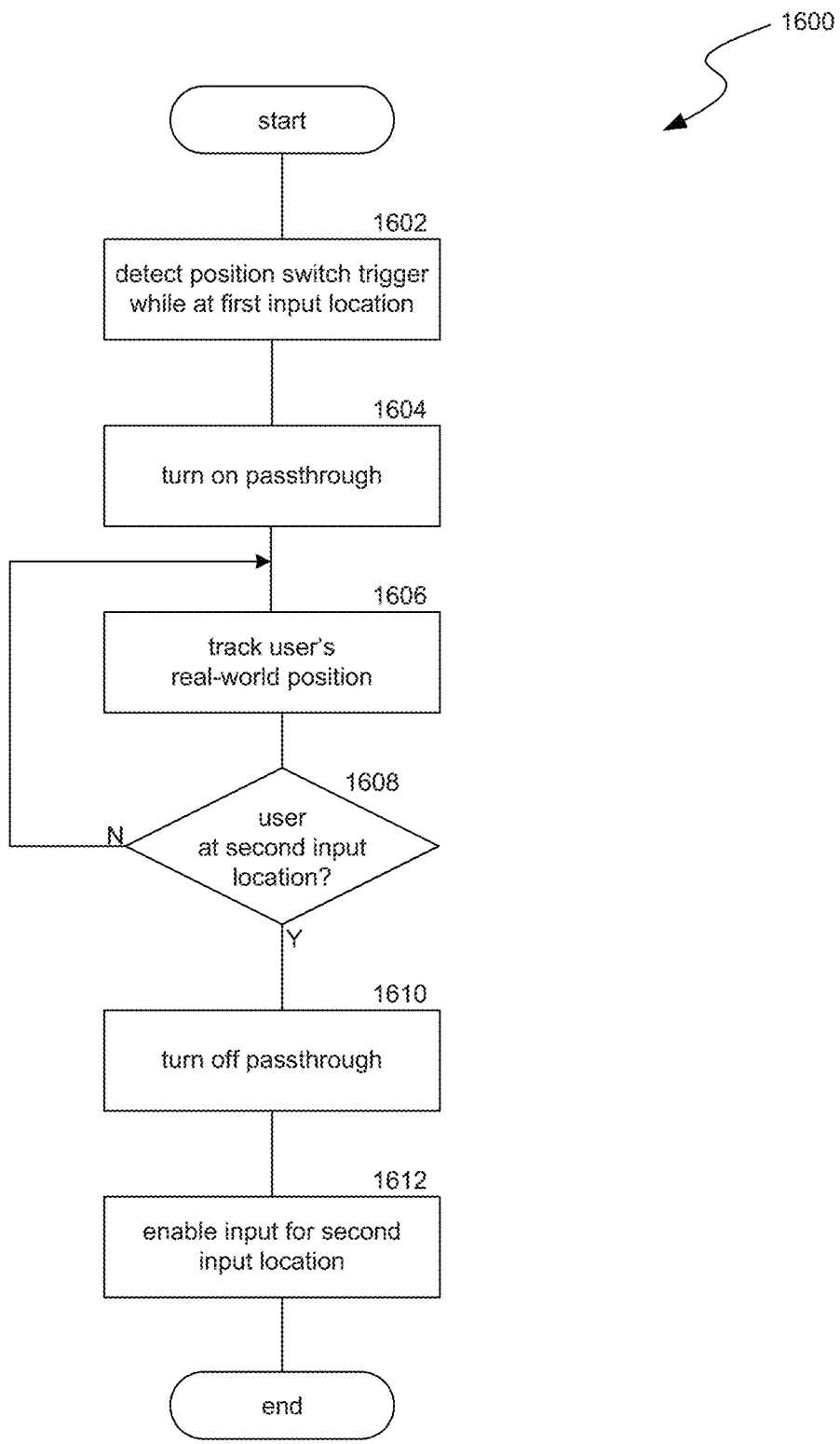
FIG. 16 is a flow diagram illustrating a process used in some implementations of the present technology for transitioning between designated desk and whiteboard areas in an artificial reality working environment.

FIG. 16 is a flow diagram illustrating a process 1600 used in some implementations of the present technology for transitioning between designated desk and whiteboard areas in an artificial reality working environment. Process 1600 can be available when a user enters an artificial reality working environment and can be triggered (at block 1602) according to position switch triggers. At block 1602, process 1600 can detect, while a user is at a first input location, a position switch trigger. In various some implementations, the position switch trigger can be an activation of a control by the user, such as by pressing a control on a controller or the HMD or activating a soft control available in the artificial reality working environment. In some cases, process 1600 can automatically detect the position switch trigger, such as when the user stands up from her desk, or at least partially exits a designated area (e.g., leaves the designated whiteboard space, leaves the designated desk area, puts her head outside one of these areas, etc.). Such triggers can be detected based on monitored position and/or height tracking of the XR device. Additional details on multiple input locations, including a desk area and a whiteboarding area, are discussed above in relation to FIG. 7.

At block 1604, process 1600 can turn on passthrough. The passthrough, in this instance, provides the user a view into their external environment for navigating between physical locations. This can include showing only the physical environment or can include the physical environment with certain overlays, such as arrows directing the user between their previous input location to their other input location (e.g., from the desk area to the whiteboard area or from the whiteboard area to the desk area). In some cases, another overlay on the pass-through can include an indication of what is happening in the second input location, such as showing a partially opaque version of the second input location. This can allow the user to enter the second input location at a spot where they will not be on top of another user (especially where the second input location is shared, such as the whiteboard area).

At block 1606, process 1600 can track the user's real-world position as she moves between input areas. This can include typical 6 DoF movement tracking of the user, such as by monitoring time-of-flight results for structured light emitted by the XR device and mapping the position data, e.g., using a simultaneous localization and mapping (SLAM) system. In some implementations, a visual effect can be applied to the user, to be viewed by other users sharing the artificial reality working environment, while the user is in transit between first and second input locations or is otherwise not in either input location. For example, the user's avatar can be blurred or given a "teleportation" effect to signify that the user is not currently in an input area. In some cases, the user's avatar can also be shown as moving between her desk and the whiteboard area in the artificial reality working environment. This can include monitoring the user's progress between the two areas in the real-world (e.g., determining a percentage of the distance traveled between the two areas) and presenting the user's avatar at a same percentage distance between the two virtual areas in the room configuration, even when the distances are different in the artificial reality working environment as opposed to their distances for the user in the real-world.

At 1608, process 1600 can determine whether a user has arrived at the second input location. If not, process 1600 continues to track the user's real-world position by returning to block 1606. If the user returns to the first input location, process 1600 can turn off passthrough and end. If the user arrives at the second input location, process 1600 can continue to block 1610.

At block 1610, process 1600 can turn off passthrough, returning the user to the immersive artificial reality working environment. If the user's avatar was shown with an effect during the transition between input locations, the effect can be disabled, returning the user's avatar to normal. At block 1612, process 1600 can enable input modalities for the second input location. For example, if the first input location was the desk area and the second input location is the whiteboard area, the user's avatar can be centered in the whiteboard area and enabled to write on the whiteboard. As another example, if the first input location was the whiteboard area and the second input location is the desk area the user's avatar can be displayed as sitting at her desk and enabled to interact with her desk's dedicated space and tracked objects on the desk.

Figure 17:
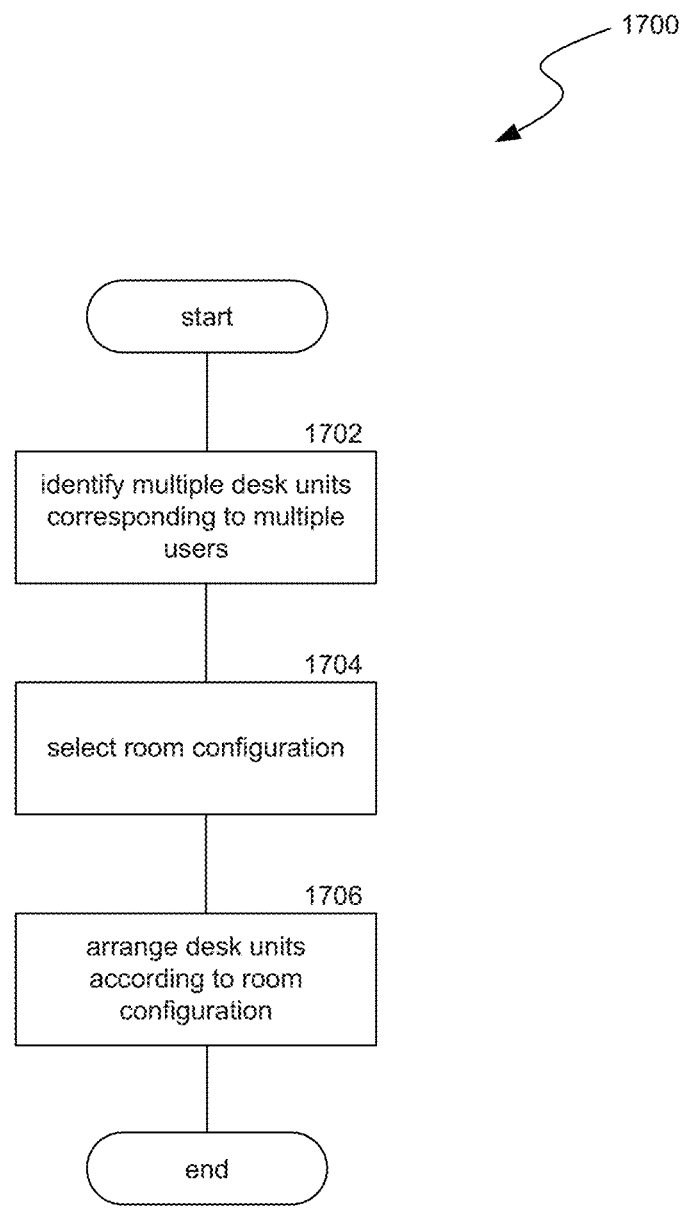
FIG. 17 is a flow diagram illustrating a process used in some implementations of the present technology for combining multiple artificial reality desk spaces into a room configuration.

FIG. 17 is a flow diagram illustrating a process 1700 used in some implementations of the present technology for combining multiple artificial reality desk spaces for different users into a room configuration. Process 700 can be initiated in response to multiple users joining the same artificial reality working environment. At block 1702, process 1700 can identify multiple desk units corresponding to the multiple users who have joined the same artificial reality working environment.

At block 1704, process 1700 can select a room configuration. In various implementations, available room configurations can include one or more of a conference table configuration (see FIG. 18A, discussed below), a pod of desks configuration (see FIG. 18B, discussed below), a presentation configuration (see FIG. 18C, discussed below), or a single desk with mirrored workspace configuration (see FIG. 18D, discussed below).

In some cases, the selection of the room configuration can be in response to a manual user selection from the available configurations. In other cases, room configuration selection can be automatic. For example, presentation mode can be automatically selected when a user has written to more than a threshold amount of the shared whiteboard. As another example, presentation mode can be automatically selected when a user activates a presentation status in another application (e.g., entering presenting mode in a slide deck, becoming a presenter in a video chat application, etc.). As another example presentation mode can be selected based on a change in a speaker's voice over a common voice chat channel, e.g., when a user raises her voice above a certain level, presentation mode is enabled. In yet another example, presentation mode can be enabled when a user with certain preferences or user-type enters the artificial reality working environment, e.g., when a user signified as a panelist or professor enters an artificial reality working environment, they can be selected as a presenter and presentation mode is selected. In some cases, a machine learning model can be used to select a current room configuration where input to the model can be factors such as number of participants in the artificial reality working environment, content of a conversation occurring between artificial reality working environment participants, content of shared documents, etc. This model can be trained to select a room configuration based on training data that pairs these types of input with previous manual user selections of room configurations.

A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include: neural networks, support vector machines, decision trees, Parzen windows, Bayes, clustering, reinforcement learning, probability distributions, decision trees, decision tree forests, and others.

In some implementations, all participants of an artificial reality working environment can see the same room configuration, while in other implementations different participants can have different room configuration selected to see different layouts of the desks of the participants.

At block 1706, process 1700 can arrange desk units according to the room configuration selected at block 1704. In some implementations, a selected room configuration can be dynamic to accommodate different number of participants such that the room can be resized and adjusted according to the number of participants. In addition, rooms may automatically adjust their size and configuration as additional participants join or leave a room. In some cases, desk configurations and room sizes can grow as participants are added to the artificial reality working environment, but as participants leave the room does not shrink and desks are shown as empty. In some implementations, where a room configuration has empty desk spaces, a user can select an empty desk space and teleport her avatar to that space.

To reduce disorientation that could result when room configurations change as individual participants join, room and desk configurations can be incremented by multiple desks at certain threshold levels. For example, a room can initially be configured for four desks and when a fifth person enters the artificial reality working environment, desks for the fifth participant and an open desk for a yet undetermined six participant can be added. Further once the sixth participant and a seventh participants are added, open desks for participants seven through ten can be added. This process can continue, exponentially adding additional participants as additional desks are needed or, once a set level is reached (e.g., adding five new empty desks at a time), this number of empty desks can be added each time additional desks are needed.

Figure 18A:
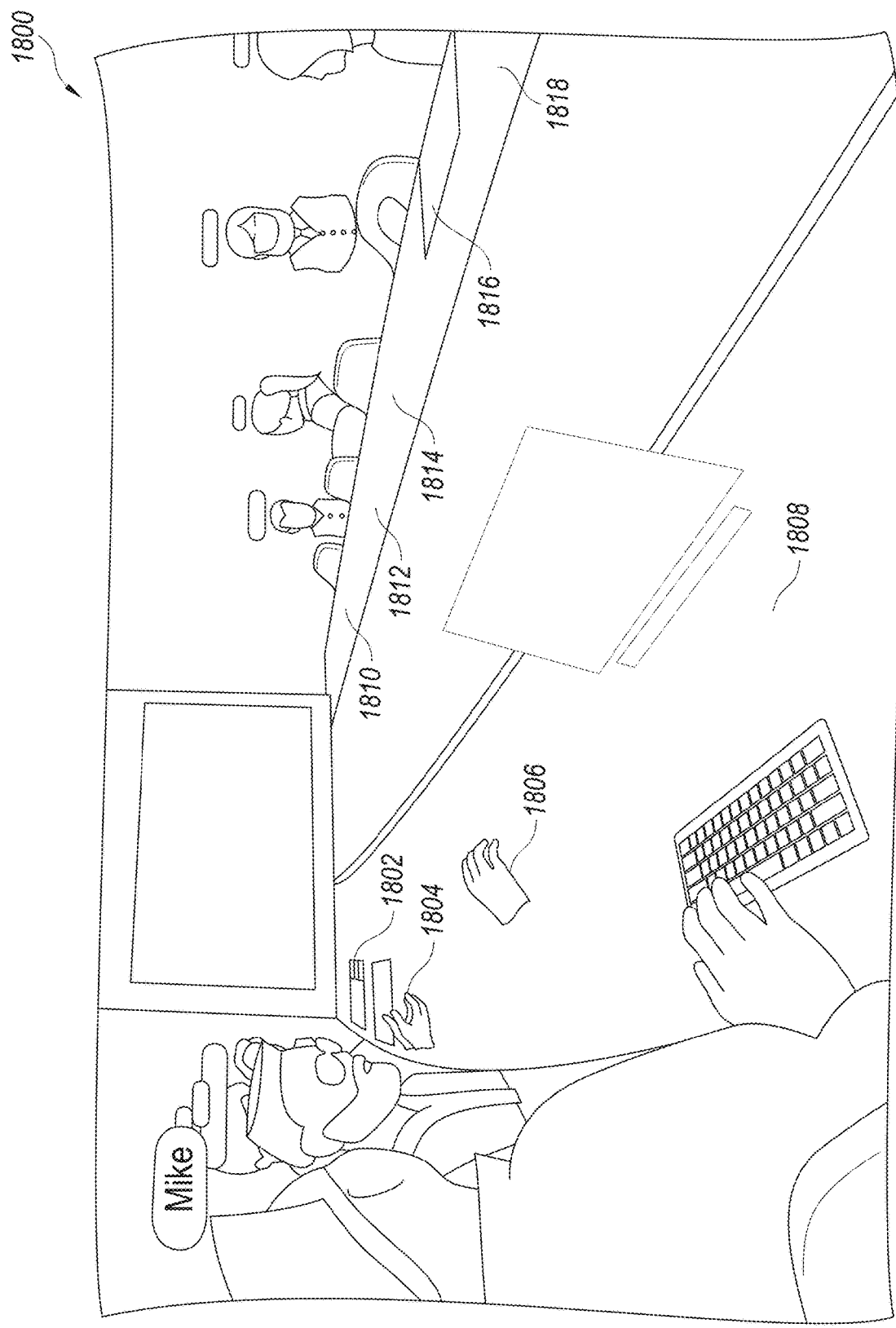
FIGS. 18A-18D are conceptual diagrams illustrating examples of multi-desk room configurations.
Figure 18B:
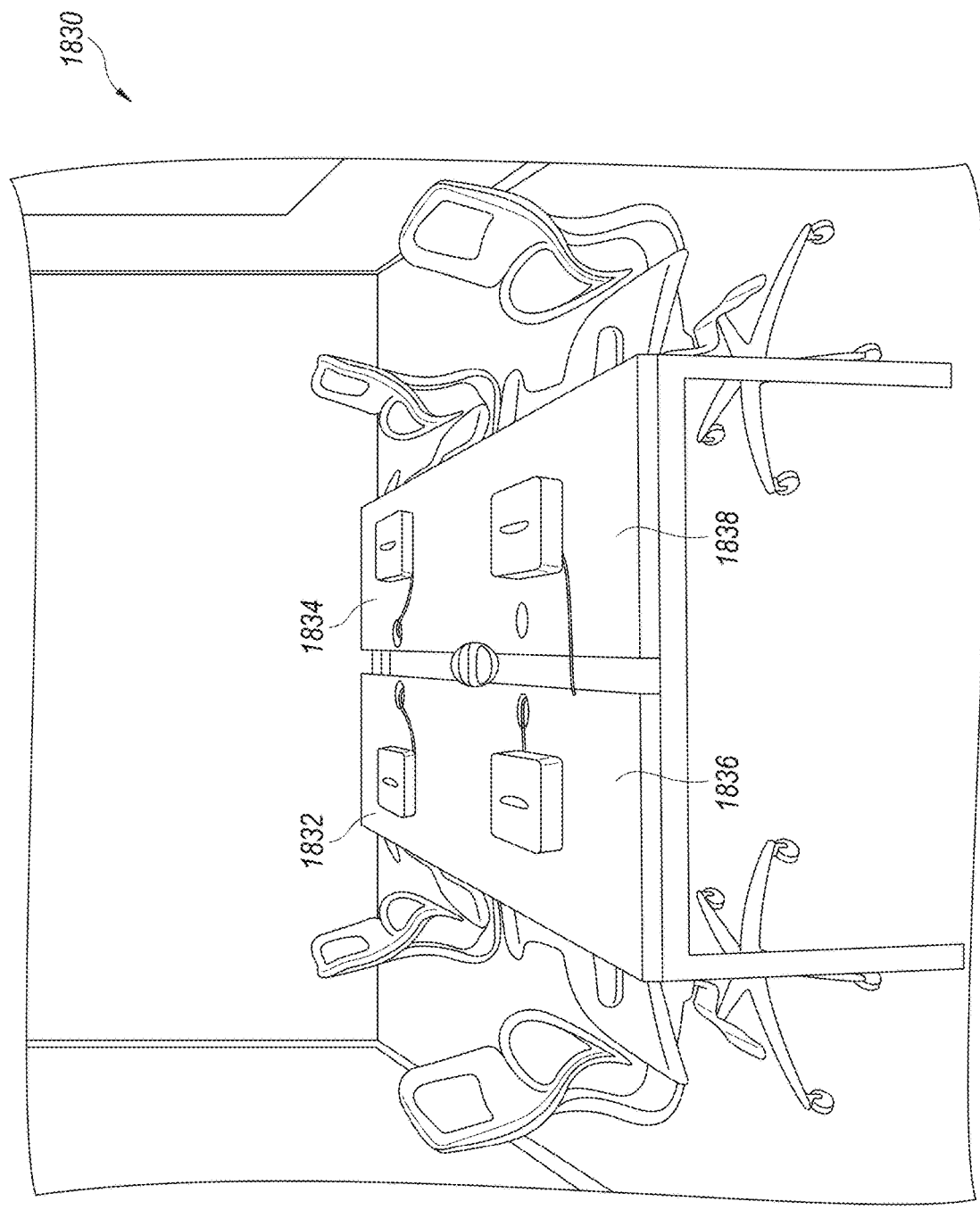

FIGS. 18A-18D are conceptual diagrams illustrating examples of multi-desk room configurations. FIG. 18A is a conceptual diagram illustrating an example 1800 of multiple desks in a conference room configuration. Example 1800 illustrates desks 1802-1818, where these desks have been joined into a seamless conference room table. FIG. 18B is a conceptual diagram illustrating an example 1830 of a pod of desks room configuration. Example 1830 illustrates desks 1832-1838, where these desks have been arranged in a group (in this case a square but other arrangements can be used).

Figure 18C:
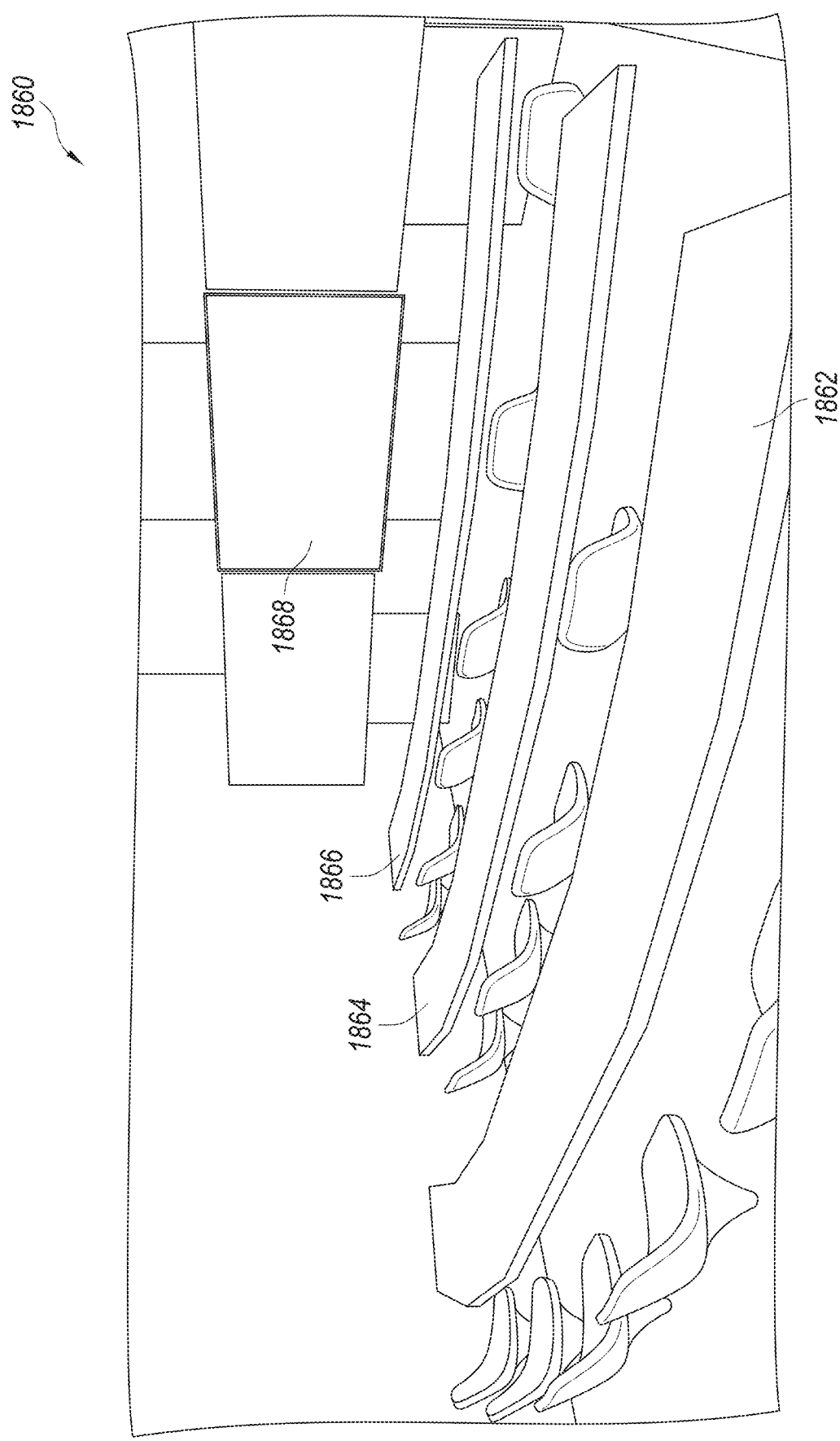
Figure 18D:
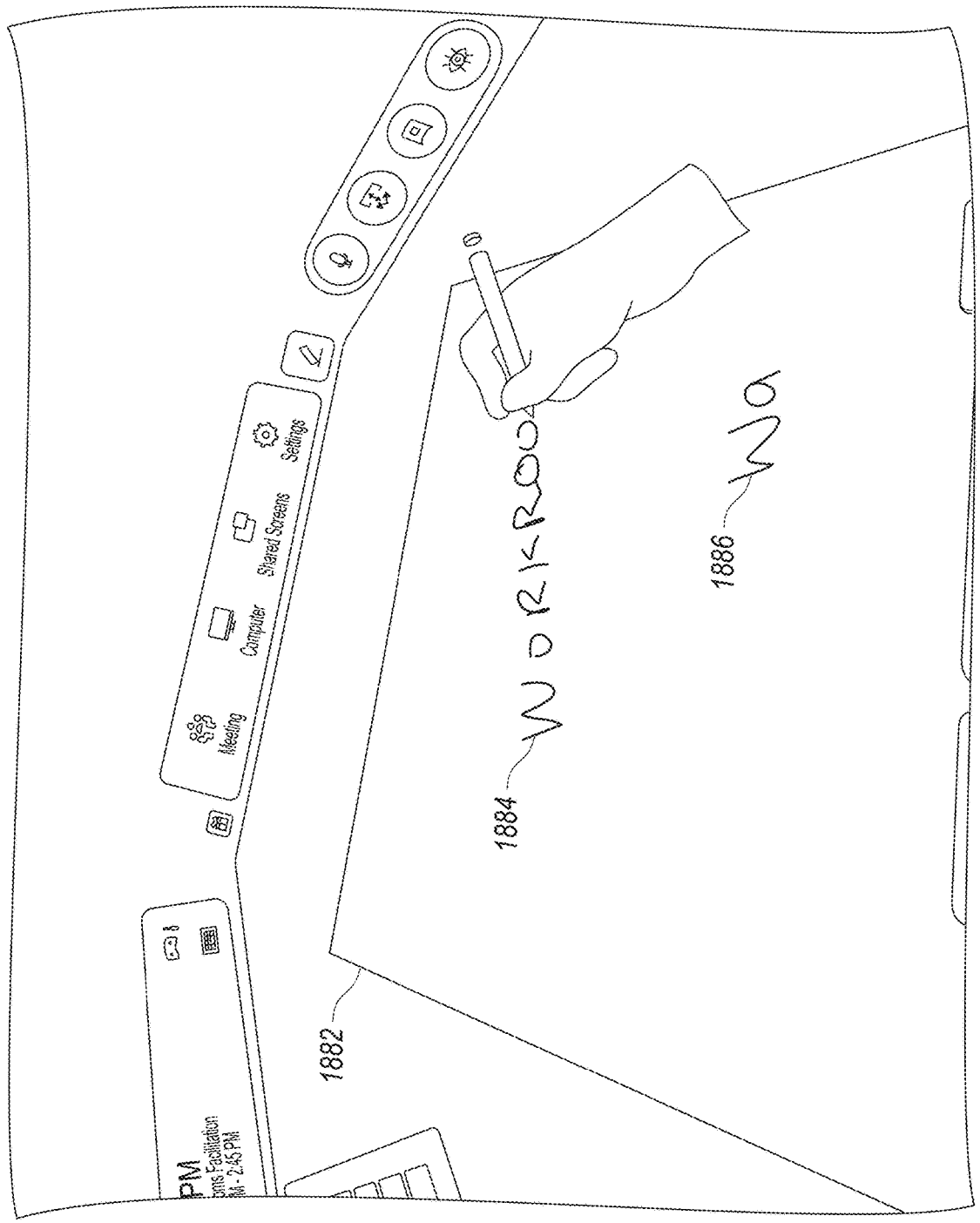

In various implementations, the pod can have various features such as dividers between desks. FIG. 18C is a conceptual diagram illustrating an example 1860 of a presentation room configuration. Example 1860 illustrates rows of desks 1862-1866 (in this case joined into tables, but can be separate desks or other arrangements), where the desks have been arranged to face a presenter, in this case a whiteboard area 1868. FIG. 18D is a conceptual diagram illustrating an example 1880 of a mirrored workspace room configuration. In example 1880, there are multiple desks either shown separately or in one of the other room configurations. However, the designated area 1882 of each of these desks has been linked so they show the same content. In example 1880, a user is writing content 1884 to the designated area while another user is writing content 1886 to her designated area. Both users see both content 1884 and 1886 on their desks.

Figure 19:
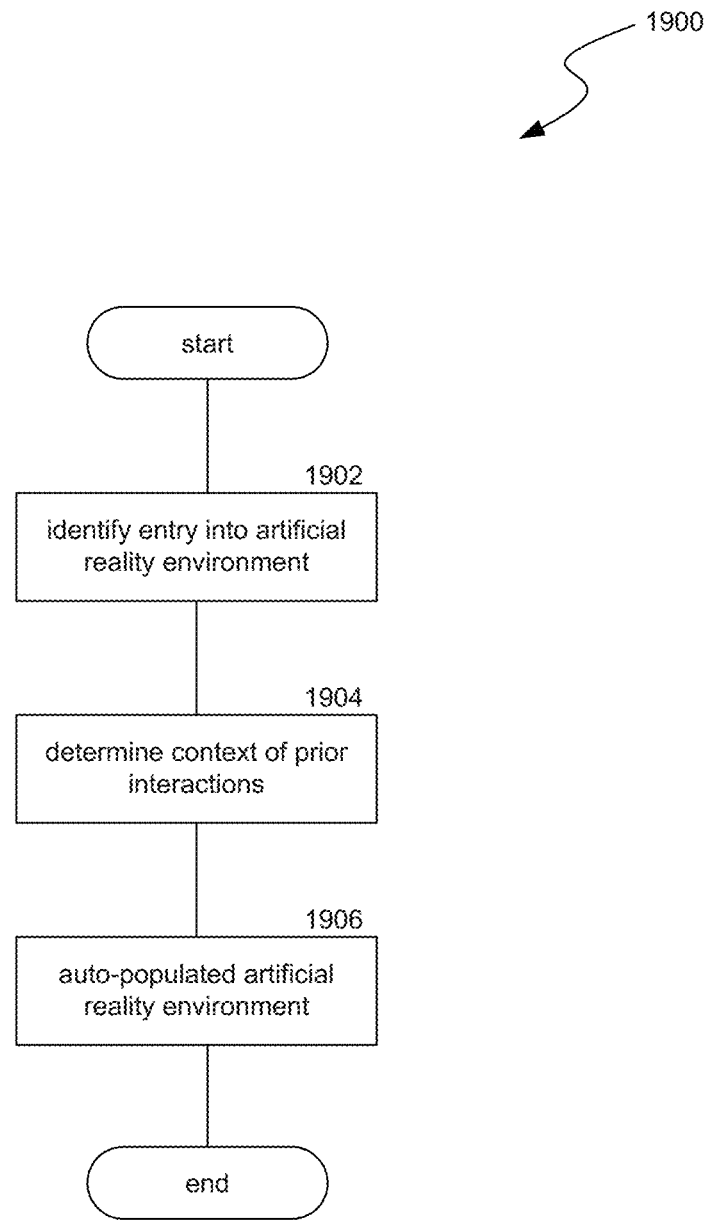
FIG. 19 is a flow diagram illustrating a process used in some implementations of the present technology for automatically adding content items and users to an artificial reality workroom environment based on a context of prior interactions.

FIG. 19 is a flow diagram illustrating a process 1900 used in some implementations of the present technology for automatically adding content items and users to an artificial reality workroom environment based on a context of prior interactions. In some implementations, process 1900 can be performed in response to a user entering an artificial reality working environment, as detected at block 1902. For example, this can occur when a user puts on an XR device or when a user opens an application on their XR device for artificial reality working environments.

At block 1904, process 1900 can determine a context from prior interactions of the user. In various implementations, the context can be from previous interactions on other devices (such as the user's computer, phone, or another communication device e.g., a video calling device). In some cases, the context can be based on a thread with which the user was engaged a threshold amount of time (e.g., five minutes) prior to entering the artificial reality working environment. A "thread" can be any communication involving multiple participants, such as a chat application, email, a video call, phone call, text message, a workgroup, a social media post, a team folder, cloud storage space, etc. In various implementations, the context can include identifications of users that were part of the thread, content items shared over the thread, and/or content of the conversation in the thread. In some cases, a context can include indications of what the user was working on (whether in a thread or not) within a threshold time (e.g., ten minutes) prior to entering the artificial reality working environment. For example, this can include indications of content items the user had open or interacted with at least a threshold number of times or for a threshold amount of time.

At block 1906, process 1900 can auto-populate an artificial reality working environment. In some cases, the context from block 1904 can be used to automatically add users, identified in the context, to the same artificial reality working environment upon each user putting on her XR device. This can also include automatically setting up artificial reality working environment access permissions for the people identified in the context. In some implementations, the context from block 1904 can be used to automatically add the identified content items to the artificial reality working environment (e.g., adding the content items that had been shared in a thread, a representation of the history of the thread discussion, content items the user was working on, etc.) In various implementations, which users in the artificial reality working environment can initially see these content items can be based on who had access to them prior to entering the artificial reality working environment. For example, a content item shared to a thread can be shown to all participants of the thread while a content item accessed by a particular user prior to entering the artificial reality working environment can be shown only to that user until that user provides an indication to share the content item with other artificial reality working environment participants.

In some implementations, participants of the thread can be automatically brought into the artificial reality working environment, even when they are not using an XR device. For example, a video call thread can include 2D panels, each showing one of the feeds from a video call participant who has not entered the artificial reality working environment. Similarly, participants providing audio-only content to a thread (e.g., a voice call) can have their audio streamed into the artificial reality working environment that corresponds to the thread.

The XR work system can also provide mechanisms to allow a user to easily move content items from their other devices into the artificial reality working environment. For example, an application on the user's computer can allow the user to drag content items onto a control, which will cause the content items to appear in the artificial reality working environment. As another example, a user can employ a virtual assistant to recognize a voice command that specifies a content item and an instruction to have the content item available in the artificial reality working environment. In a further example, a control can be added (e.g., as an extension, plugin, etc.) to various applications that, when activated, cause the current content item in that application to be available in the artificial reality working environment. In yet a further example, where a user is in the artificial reality working environment and is streaming her computer screen into the artificial reality working environment, the user can perform a gesture that "grabs" items shown on the computer screen and pulls time into the artificial reality working environment, causing the computer to provide the grabbed content item to the XR device for display in the artificial reality working environment. Determining which item is grabbed and moving into the artificial reality working environment can be performed in a manner similar to that described in U.S. patent application Ser. No. 16/661,945, filed Oct. 23, 2019, which is incorporated herein by reference in its entirety. Additional details on adding content items to the artificial reality working environment are described below in relation to the example in FIG. 20.

Figure 20:
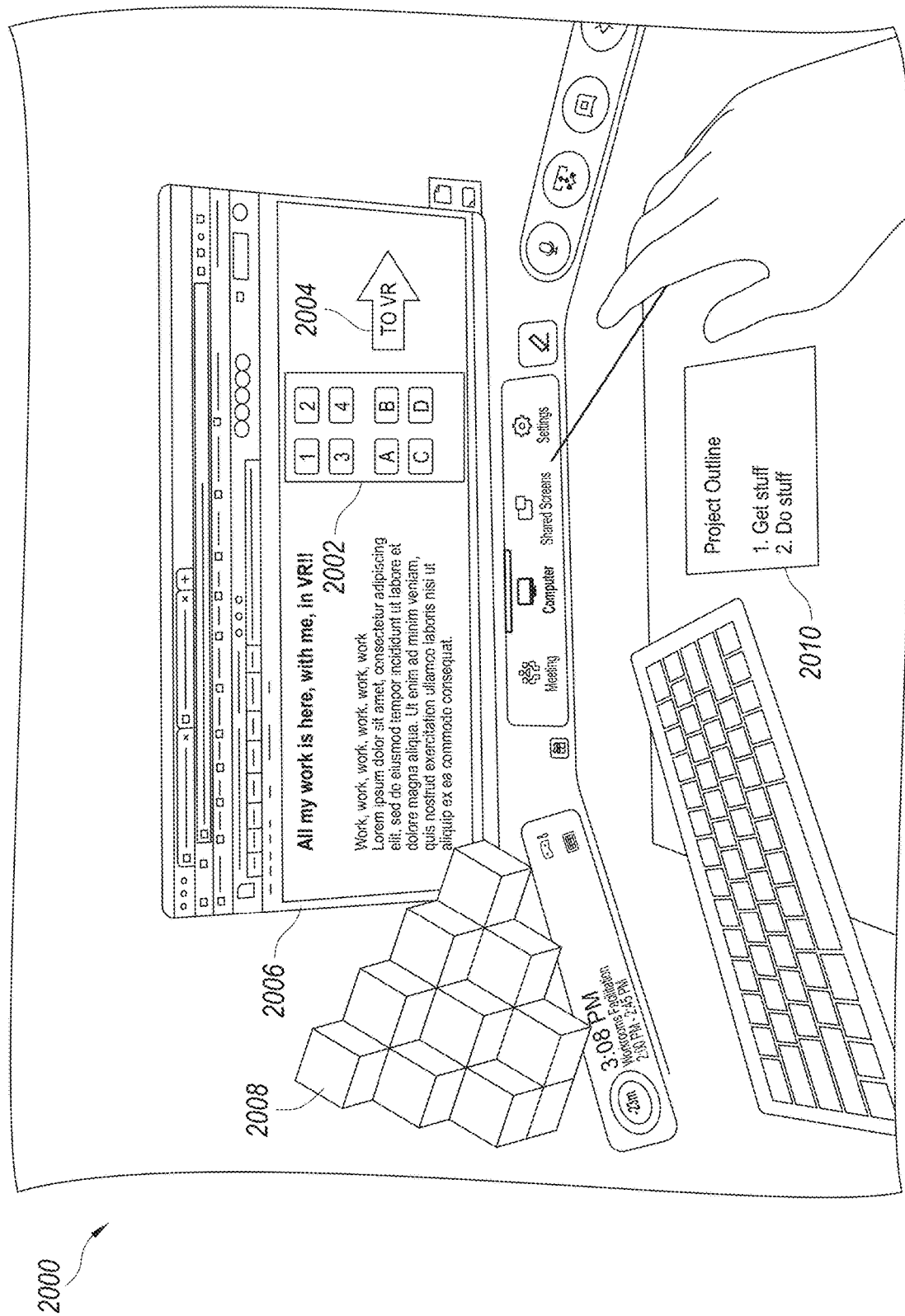
FIG. 20 is a conceptual diagram illustrating an example of automatically populated content added to an artificial reality working environment.

FIG. 20 is a conceptual diagram illustrating an example 2000 of automatically populated content added to an artificial reality working environment. Example 2000 includes a computer screen 2006 that is being streamed into the artificial reality working environment. The computer screen 2006 is displaying files for content items 2002, which the user can move into the artificial reality working environment by dragging any one to the "to VR" control 2004. A user can also bring any of these content items into the artificial reality working environment by reaching into the computer screen 2006 and pulling a content item out. Before the user entered the artificial reality working environment, she was in a chat thread with other users. In that chat thread the user had shared a Project Outline content item 2010. Further, just prior to entering the artificial reality working environment, the user was working on a 3D model 2008 on her computer. The XR work system identified a context of the user entering the artificial reality working environment, including that the content item 2010 was shared in the recent thread and that the user was working in content item 2008. Upon entering the artificial reality working environment, the XR work system automatically brought content items 2008 and 2010 into the artificial reality working environment. Providing the flat document 2010 as an item on the user's dedicated desk space and the 3D model 2008 as a 3D object above the user's dedicated desk space.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A computing system comprising:
   one or more processors; and
   one or more memories storing instructions that, when executed by the one or more processors, cause the computing system to perform a process comprising:
   establishing at least two virtual areas, each corresponding to a real-world area; and
   providing an artificial reality environment in relation to one or more virtual areas corresponding to one or more real-world areas by:
   transitioning between a first of the one or more virtual areas to a second of the one or more virtual areas by:
   detecting a position switch trigger;
   turning on a passthrough mode that presents, in the artificial reality environment, a display of the real-world;
   detecting that a user has arrived at the second of the at least two virtual areas; and
   disabling the passthrough mode.

2. The computing system of claim 1, wherein the process further comprises identifying an assigned virtual space in relation to a surface of a real-world desk and setting, based on an identified height in the one of the one or more real-world areas, the height of the virtual desk in the one or more virtual areas corresponding to the real-world area that includes the real-world desk.

3. The computing system of claim 1, wherein the position switch trigger comprises detecting that the user has stood up.

4. The computing system of claim 1, wherein the passthrough mode includes displaying an overlay, of at least part of the second of the one or more virtual areas, over the display of the real-world.

5. The computing system of claim 1,
   wherein at least one of the one or more virtual areas is a whiteboarding area;
   wherein the whiteboarding area includes multiple whiteboard units, each whiteboard unit being the same specified size; and
   wherein, when in the whiteboarding area, the user can activate a command or control to move between the multiple whiteboard units without having to move in a longitude or latitude direction in the real-world.

6. The computing system of claim 2, wherein the identified height in the one of the one or more real-world areas is a height of the real-world desk.

7. The computing system of claim 2, wherein the identified height in the one of the one or more real-world areas is based on a determined vertical position of a tracked keyboard.

8. A method comprising:
   providing an artificial reality environment in relation to one or more virtual areas corresponding to one or more real-world areas by:
   identifying an assigned virtual space in relation to a surface of a real-world desk in one of the real-world areas, wherein the assigned virtual space is at least a pre-determined size;
   automatically identifying that there is not enough open space on the surface of the real-world desk for the pre-determined size of the assigned virtual space and in response, and warning a user to make available additional space on the surface of the real-world desk; and setting a height of a virtual desk in one of the one or more virtual areas, corresponding to the real-world area that includes the real-world desk.

9. The method of claim 8 further comprising:
interfacing with a real-world keyboard that is at least partially in the dedicated space;
causing the real-world keyboard to display a pattern of lights; and
tracking the real-world keyboard based on recognizing the pattern of lights.

10. The method of claim 8 further comprising:
detecting that a user's attention is focused outside a current virtual area, of the one or more virtual areas, that corresponds to a real-world location in which the user is located; and
in response, automatically turning on a passthrough mode that presents, in the artificial reality environment, a display of the real-world.

11. A computer-readable storage medium storing instructions that, when executed by a computing system, cause the computing system to perform a process comprising:
establishing at least two virtual areas, each corresponding to a real-world area;
providing an artificial reality environment in relation to the at least two virtual areas; and
transitioning a user representation, of a user, between a first of the at least two virtual areas to a second of the at least two virtual areas by:
detecting a position switch trigger;
turning on a passthrough mode that presents, in the artificial reality environment, a display of the real-world;
detecting that the user has arrived at the second of the at least two virtual areas; and
disabling the passthrough mode.

12. The computer-readable storage medium of claim 11, wherein the second of the at least two virtual areas is a whiteboarding area, and wherein the whiteboarding area is associated with multiple whiteboards, that each correspond to a particular project or team and that can be individually activated.

13. The computer-readable storage medium of claim 11, wherein the detecting that the user has arrived at the second of the at least two virtual areas includes detecting that the user has moved from A) the real-world area corresponding to the first of the at least two virtual areas to B) the real-world area corresponding to the second of the at least two virtual areas.

14. The computer-readable storage medium of claim 11, wherein the process further comprises:

identifying a height of a dedicated space on a surface of a real-world desk in one of the real-world areas;
setting a height of a virtual desk, based on the identified height of the dedicated space, in one of the at least two virtual areas, corresponding to the real-world area that includes the real-world desk; and
setting one or more anchors, in relation to the dedicated space, where each anchor is identified as a location in the artificial reality environment for placing virtual content.

15. The computer-readable storage medium of claim 14, wherein the process further comprises:
receiving a stream of the display of a real-world computer; and
displaying content from the display of a real-world computer, in the artificial reality environment, with a location based on at least one of the one or more anchors.

16. The computer-readable storage medium of claim 11, wherein at least one of the at least two virtual areas is a whiteboarding area;
wherein the real-world area corresponding to the whiteboarding area includes a wall, wherein a portion of the wall is associated with a virtual whiteboard; and
wherein interactions by the user with the portion of the wall are interpreted as interactions with the virtual whiteboard.

17. The computer-readable storage medium of claim 11, wherein at least one of the at least two virtual areas is a whiteboarding area;
wherein the real-world area corresponding to the whiteboarding area includes a 2D plane, in the air, associated with a virtual whiteboard; and
wherein interactions by the user that intersect the 2D plane are interpreted as interactions with the virtual whiteboard.

18. The computer-readable storage medium of claim 11, wherein the passthrough mode includes a direction overlay indicating a direction for the user to reach the second of the at least two virtual areas.

19. The computer-readable storage medium of claim 11, wherein the first of the at least two virtual areas includes a virtual desk with one or more content items displayed on a surface of the virtual desk;
wherein the second of the at least two virtual areas includes a whiteboard, and
wherein the process further comprises, in response to the detecting that the user has arrived at the second of the at least two virtual areas, automatically displaying the one or more content items from the surface of the virtual desk on the whiteboard.

* * * * *